US010679234B2

United States Patent
Blasi et al.

(10) Patent No.: US 10,679,234 B2
(45) Date of Patent: Jun. 9, 2020

(54) WIRELESS NETWORK LOAD MANAGEMENT SYSTEM

(71) Applicant: Accenture Global Solutions Limited, Dublin (IE)

(72) Inventors: Luca Blasi, Rome (IT); Margherita Mariotti, Rome (IT); Mattia Lavena, Rome (IT); Simone Catenacci, Rome (IT); Federico Renzi, Rome (IT); Silvia Arcieri, Rome (IT); Francesca Falcone, Rome (IT); Susanna Cipolla, Rome (IT); Roberta Vigorosi, Rome (IT); Aldo Moriconi, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 287 days.

(21) Appl. No.: 15/658,019

(22) Filed: Jul. 24, 2017

(65) Prior Publication Data

US 2019/0026767 A1  Jan. 24, 2019

(51) Int. Cl.
*G06Q 30/02* (2012.01)
*H04W 48/06* (2009.01)
*H04W 28/02* (2009.01)

(52) U.S. Cl.
CPC .... *G06Q 30/0226* (2013.01); *H04W 28/0226* (2013.01); *H04W 28/0289* (2013.01); *H04W 48/06* (2013.01)

(58) Field of Classification Search
CPC ............. G06Q 30/0226; H04W 48/06; H04W 28/0226; H04W 28/0289
See application file for complete search history.

(56) References Cited

U.S. PATENT DOCUMENTS 8,858,338 B2  10/2014  Bethke et al.
9,516,174 B1  12/2016  Vishwanath
(Continued)

FOREIGN PATENT DOCUMENTS

WO  WO 2011/017199 A2  2/2011
WO  WO 2011/157570 A1  12/2011
(Continued)

OTHER PUBLICATIONS

"Managing Cellular Congestion Using Incentives" Jagadeesh M. Dyaberi, Saavn LLC; Nov. 2012 IEEE.*
(Continued)

*Primary Examiner* — Victoria E Frunzi
(74) *Attorney, Agent, or Firm* — Brinks Gilson & Lione

(57) ABSTRACT

Systems and methods for managing mobile network loads are provided. A load manager may communicate with a plurality of mobile devices in wireless communication with a hardware infrastructure of a mobile network. The hardware infrastructure may provide wireless access to the mobile network. The load manager may receive an infrastructure performance indicator descriptive of operation of the hardware infrastructure in wireless communication with one of the plurality of mobile devices at one of multiple geographic locations wirelessly served by the hardware infrastructure. The load manager may generate, based on analysis of the infrastructure performance indicator, a reward record configured to associate a reward with a target geographic location wirelessly served by the hardware infrastructure. The load manager may instruct a mobile devices to display an indication of the reward record at a position on the display of the mobile device representative of the target geographic location.

19 Claims, 13 Drawing Sheets

(56) References Cited

U.S. PATENT DOCUMENTS

| | | | | |
|---|---|---|---|---|
| 9,532,261 | B2* | 12/2016 | Raleigh | H04W 36/245 |
| 9,642,039 | B2* | 5/2017 | Schoenen | H04W 28/08 |
| 2011/0223895 | A1* | 9/2011 | Wagda | H04W 4/20 |
| | | | | 455/414.2 |
| 2012/0226532 | A1* | 9/2012 | Prabhakar | G06Q 30/02 |
| | | | | 705/14.14 |
| 2013/0262203 | A1* | 10/2013 | Frederick | G06Q 30/0209 |
| | | | | 705/14.12 |
| 2013/0275221 | A1* | 10/2013 | Zeto, III | G06Q 30/0261 |
| | | | | 705/14.58 |
| 2016/0092923 | A1* | 3/2016 | Grenier | G06F 16/9537 |
| | | | | 705/14.36 |
| 2017/0064569 | A1 | 3/2017 | Martone et al. | |

FOREIGN PATENT DOCUMENTS

| | | |
|---|---|---|
| WO | WO 2015/089193 A1 | 6/2015 |
| WO | WO 2017/120074 A1 | 7/2017 |

OTHER PUBLICATIONS

Extended European Search Report, issued in EP Application No. 18182876.5, dated Nov. 20, 2018, pp. 1-11, European Patent Office, Munich, Germany.

\* cited by examiner

WIRELESS NETWORK LOAD MANAGEMENT SYSTEM

TECHNICAL FIELD

This disclosure relates to managing mobile network loads and, in particular, to using mobile devices for monitoring and measurement of network parameters at server directed locations.

BACKGROUND

A wireless network may include equipment that provides wireless services to multiple geographic areas. The equipment used to implement the wireless network may be subject to loads by nodes communicating over the wireless network. The equipment may have limited capacity to serve the nodes within coverage areas of the wireless network. Movement of the nodes in and out of the coverage areas and variations in data consumption may impact the service provided by the wireless network. In addition, the equipment may experience wear and tear as weather, usage, age, design errors and other factors negatively influence the wireless network. Present approaches to monitoring and managing the loads of wireless networks suffer from a variety of drawbacks, limitations, and disadvantages. There is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
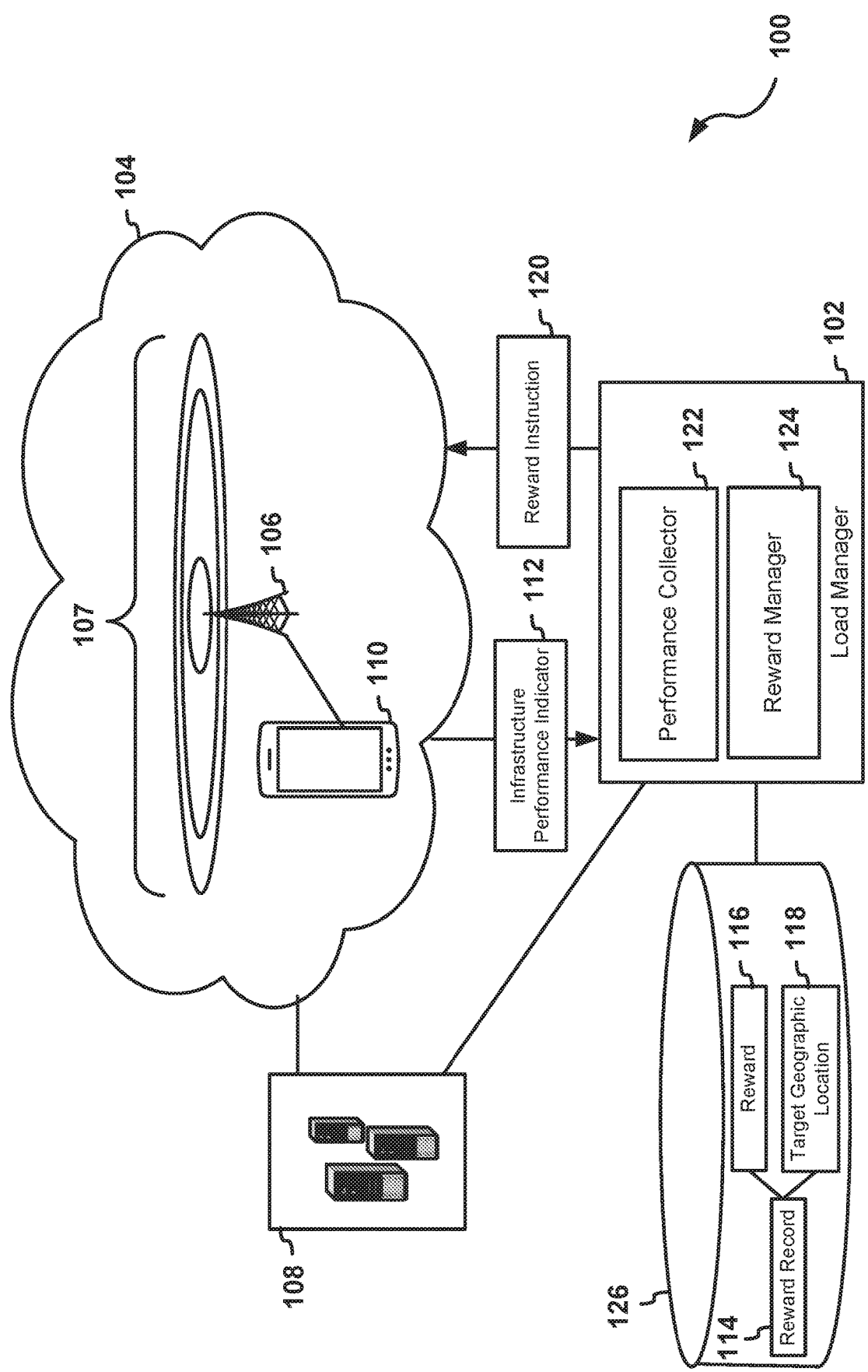
FIG. 1 illustrates an example of a system 100 for managing mobile network loads.

By way of an introductory example, a system may include a load manager. The load manager may communicate with a plurality of mobile devices in wireless communication with a hardware infrastructure of a mobile network. The hardware infrastructure may be configured to provide wireless access to the mobile network. The load manager may determine an infrastructure performance indicator descriptive of operation of the hardware infrastructure in wireless communication with one of the plurality of mobile devices at one of multiple geographic locations wirelessly served by the hardware infrastructure. The load manager may receive a prompt for one of the plurality of mobile devices to be located at a first geographic location wirelessly served by the hardware infrastructure. The load manager may generate, the one of the plurality of mobile devices being located at the first geographic location and/or based on analysis of the infrastructure performance indicator, a reward record configured to associate a reward with a target geographic location wirelessly served by the hardware infrastructure. The load manager may instruct the one of the plurality of mobile devices to display an indication of the reward record at a position on the display of the mobile device representative of the target geographic location.

According to a second aspect of the system, the infrastructure performance indicator may include a performance metric. The performance metric may include at least one of a quantity of information communicated between the mobile device and the hardware infrastructure or a measurement of a quality of service between the mobile device and the hardware infrastructure.

According to a third aspect of the system, the load manager may receive a current geographic location of the one of the plurality of mobile devices. The load manager may cause the reward to be associated with an account corresponding to the one of the plurality of mobile devices in response to the current geographic location being within a predefined distance of the target geographic location.

According to a forth aspect of the system, the load manager may receive, from a terminal device, a triggering condition and a reward creation parameter. The triggering condition may include a condition for generating the reward record based on the infrastructure performance indicator. The reward creation parameter may include an identifier of the target geographic location.

According to a fifth aspect of the system, the load manager may determine the triggering condition is satisfied based on the infrastructure performance indicator. The load manager may generate, in response to satisfaction of the triggering condition, the reward record to associate the reward with the target geographic location based on the reward creation parameter.

According to a sixth aspect of the system, the triggering condition may include a criteria applicable to at least one performance indicator related to a first portion of the hardware infrastructure and the identifier of the target geographic location corresponds to a geographic location wirelessly served by a second portion of the hardware infrastructure.

According to a seventh aspect of the system, the load manager may receive a message from a mobile device including a request to claim the reward. The load manager may cause, in response to request, the reward to be associated with an account corresponding to the mobile device.

According to an eighth aspect of the system, the load manager may transmit the infrastructure performance indicator to a remotely located server.

According to a ninth aspect of the system, the infrastructure performance indicator may include an infrastructure event. The infrastructure event may be related to a portion of the hardware infrastructure that provides wireless access to a geographic area. There load manager may identify the target geographic location, the target geographic location comprising a geographic location outside of the geographic area.

According to a tenth aspect of the system, the load manager may determine that the infrastructure performance indicator is associated with a portion of the hardware infrastructure that provides wireless access to a geographic area. The load manage may determine that an origination time of the infrastructure performance indicator is older than a threshold time value. The load manager may generate the reward record in response to the original time being older than the threshold time value, wherein the target geographic location is within the geographic area. The load manager may send a reward instruction to the mobile device, the reward instruction descriptive of the reward and the target geographic location.

According to an eleventh aspect of the system, load manager may determine, based on analysis of the infrastructure performance indicator, a portion of the hardware infrastructure includes compromised networking hardware. The portion of the hardware infrastructure may be configured to provide wireless service to a geographic area. The load manager may determine a target geographic location outside of the geographic area.

According to a twelfth aspect of the system, the infrastructure performance indicator may include an infrastructure event. The infrastructure event may include an event time. The load manager may associate an activation time with the reward record based on the event time. The load manager may prohibit communication of the reward instruction before the activation time.

According to a thirteenth aspect of the system, the infrastructure performance indicator may include an infrastructure event. The infrastructure event may include an event time the load manager may associate a deactivation time with the reward record based on the event time. The load manager may prohibit communication of the reward instruction after the deactivation time.

According to a fourteenth aspect of the system, the load manager may determine the first mobile device is wirelessly served by a first portion of the hardware infrastructure. In addition, the load manager may determine a second mobile device is wirelessly served by a second portion of the hardware infrastructure. The load manager may permit the first mobile device to receive information related to the reward. The load manager may restrict the second mobile device from receiving information related to the reward.

According to a fifteenth aspect of the system, the load manager may determine the infrastructure performance indicator is associated with a first portion of the hardware infrastructure. The first portion of the hardware infrastructure may provide wireless access to a first geographic area. The load manager may identify the target geographic location. The target geographic location may be located in a second geographic area served by a second portion of the hardware infrastructure.

The system and methods described below may include any combination the aforementioned features or any other feature described in the description and illustrations provided herein. One interesting feature of the system and methods described below may be incentivizing movement of mobile devices to manage network loads placed on the mobile network. Gamified user experiences with mobile devices may provide incentives for users to physically move their mobile devices in response to reward information communicated to the mobile devices. In some examples, one or more mobile device in the mobile network may become a network quality tracker. Information from the mobile device, or other sources that provide information related to the mobile network, may be used to generate a reward associated with a geographic location. The reward may be communicated to mobile devices to incentivize movement to the geographic location, thereby influencing the loads of the mobile network. In some example, the users may interact with the reward in a gamified experience. By tracking the network quality and managing the user experience of mobile devices, the network loads of the mobile network may be efficiently managed. Alternatively or in addition, telemetry within the mobile network may be improved by incentivizing movement of mobile devices to geographic areas were additional monitoring is required. The system and methods described herein may efficiently manage network telemetry data, network loads, incentives for movement of mobile devices, and/or gamified user experiences on mobile devices.

Another interesting feature of the systems and method described below may be that incentives for moving mobile devices may be targeted to specific service coverage areas of the mobile network. For example, customer movement of a mobile device may be influenced by positioning rewards in specific locations within coverages areas of the mobile network. Targeting rewards to specific geographic areas may provide efficient management and tracking of the mobile network and improve the operation of the networking hardware of the mobile network. Additional benefits, efficiencies, and improvements over existing market solutions are made evident in the systems and methods described below. Hence, the systems and methods described herein offer improvements over existing market solutions.

FIG. 1 illustrates an example of a system 100 for managing mobile network loads. The system may include a load manager 102, a mobile network 104, a hardware infrastructure 106, a network authority 108, and/or at least one mobile device 110. In one example, the load manager 102 may receive an infrastructure performance indicator 112. Based on an analysis of the infrastructure performance indicator 112, the load manager 102 may generate a reward record 114 that is associated with a reward 116 to incentivize physical movement of the mobile device 110 to various geographical locations, such as a target geographic location 118. The load manager 102 may communicate a reward instruction 120 to the mobile device 110. The reward instruction 120 may include information descriptive of the target geographic location 118 and/or the reward 116 for moving to the target geographic location 118. The mobile device 110 may respond to the reward instruction 120 by displaying an indicator that is representative of the reward 116. In some examples, the load manager 102 cause the reward 116 to be assigned to an account of the mobile device 110 in response to the mobile device 110 moving to the target geographic location 118.

The mobile network 104 may include any network that facilitates wireless communication. The mobile network 104 may include a cellular network, a WIFI network, or any other type of network that provides wireless access to nodes. In addition, the mobile network 104 may operate on any type of frequency band or network type, including, for example, CDMA, GSM, LTE, WiMAX, EDGE, and/or any other protocol for wireless communication. The mobile network may span across one more geographic area. A coverage area of the mobile network may include an area where wireless access to the mobile network is made available by the underlying hardware of the mobile network. In some examples, the mobile network 104 may include one or more subnetwork. For example, a first network may include a CDMA network while a second network may include a GSM network. In other examples, the mobile network 104 may include any combination of one or more where at least one of the networks provide wireless access.

The hardware infrastructure 106 may include devices or circuitry that enables communication within the mobile network 104. For example, the hardware infrastructure 106 may include a cell radio tower, a transceiver, a base station, a repeater, a router, a switch, or any other type of hardware used to conduct communication within the mobile network 104. The hardware infrastructure 106 may provide wireless service to a geographic area. For example, the hardware infrastructure 106 may include a cellular radio tower that allows the mobile device 110 to access the mobile network 104 within the geographic area.

The hardware infrastructure 106 may provide service to a service area 107. The service area 107 may include a geographic area where wireless communication with the hardware infrastructure 106 is available. Devices or circuitry, such as a cell tower, may provide wireless access to the service area 107. As described in the discussion related to FIG. 7, the hardware infrastructure 106 may be divided into one or more portions which serve respective service areas.

The network authority 108 may include a mobile network operator that manages the hardware infrastructure 106 and/or the communication services available within the mobile network 104. For example, the network authority 108 may include a mobile network carrier that provides communication services, for example, text messaging, voice communications, and/or data communications. The network authority 108 may control the operation of the hardware infrastructure 106. For example, the network authority 108 may throttle bandwidth, data transfer rates, the network capacity, or any other aspect of the hardware infrastructure 106 that influences service provided to mobiles devices. In addition, the network authority 108 may manage information related to maintenance of the hardware infrastructure 106, malfunctioning equipment, trouble tickets, identification of mobile devices, metadata related to the mobile devices, and/or any other network information customarily managed by a mobile network operator. As illustrated in FIG. 1, the load manager may communicate with the network authority 108 outside of the mobile network. In other examples, the load manager 102 may communicate with the network authority through the mobile network. Alternatively or in addition the network authority may include the load manager 102 or vice versa. In some examples, the load manager 102 may communicate with multiple network authorities. For example, the load manager 102 may communicate with a first network authority corresponding to a first carrier and a second network authority corresponding to a second carrier.

The mobile device 110 may include any device that is capable of wireless communication. The mobile device 110 may receive service from the hardware infrastructure 106 and/or communicate within the mobile network 104 through the hardware infrastructure 106. The mobile device 110 may include a cell phone, a computer, a sensor, a smart device, or any other type of electronic apparatus that wirelessly communicates.

The infrastructure performance indicator 112 may describe a performance of the hardware infrastructure 106, or any portion thereof. The performance of the hardware infrastructure may include the any information that describes the operation of networking devices of the hardware infrastructure 106. For example, the infrastructure performance indicator 112 may include information that describes the wireless access provided by the hardware infrastructure 106. The infrastructure performance indicator 112 may be directly or indirectly acquired from the hardware infrastructure 106. For example the mobile device 110 may communicate information that describes a connection with the hardware infrastructure 106. Alternatively or in addition, a device within the hardware infrastructure may communicate operating information. In other examples, the network authority 108, or another source, may communicate information related to the performance of the hardware infrastructure 106. Table 1 illustrates examples of the infrastructure performance indicator 112.

TABLE 1

| | Infrastructure Performance Indicators |
|---|---|
| Usage Metrics | Number of text messages |
| | Number of calls |
| | Quantity of data usage |
| | Number of devices served |
| | Duration of session |
| | Number of sessions |
| | Download throughput |
| | Upload throughput |
| | Number of connection types by technology, for example, 3G, 4G, and/or other technologies |
| | Number of devices types by technology, brand, model, operating system, and/or any other attribute of the device |
| | Number of applications executing |
| Quality of Service Measurements | Signal Strength of a mobile device. |
| | Error codes from networking equipment. |
| | Power status of networking equipment. |
| | Number of dropped calls |
| | Customer satisfaction (NPS) |
| | Voice/Data accessibility |
| | Service downtime |
| | Latency |
| | Number of dropped calls |
| Infrastructure Events | Scheduled maintenance |
| | Trouble tickets |
| | Customer complaint incidents |
| Metadata | Type of connections, for example, 3G, 4G, and/or other |

TABLE 1-continued

Infrastructure Performance Indicators wireless technology
Names of executed applications on one or more device
Types of protocol used, for example http, https, and/or any
other type of communication protocol
Type of device, for example, technology, brand, model,
operating system, hardware types, or other attribute of a
device.
Type of used radio access, for example 2G access, 3G
access, 4G access, and/or other type of radio access
Geographic location of device
Identification information including, for example, an IP
address, MAC address, IMEI number, ESN number, and/or
other identification information.

As described in the examples listed in Table 1, the infrastructure performance indicator 112 may include usage metrics, quality of service measurements, infrastructure events, and/or metadata. The usage metrics may include metrics related to the usage of the hardware infrastructure 106. For example the usage metrics may include a quantity of data transmitted, a rate of data transmitted, a number of devices connected devices, or any other metric that quantifies consumption of services provided by the hardware infrastructure 106. The quality of service measurements may include measurements related to the quality of communication on the mobile network 104. For example, the quality of service measurements may include signal strength, radios powers, error codes, or other measurements related to service quality.

The infrastructure event may include events related to operation of the hardware infrastructure 106. The events may include trouble tickets, scheduled maintenance, error logs, or any other information related to the operation of the hardware infrastructure 106. In some examples, the infrastructure event may include times associated with the event. For example, the infrastructure event may include scheduled maintenance with a scheduled start time and stop time.

The metadata may include information descriptive of one or more mobile device and/or a networking device of the hardware infrastructure 106. In some examples, the metadata may include network identifiers of devices within the mobile network 104 including, for example, IP addresses, MAC addresses, IMEI numbers, ESN numbers, or any other kind of identifying information. In addition, the metadata may include hardware types, such as cellular radio types, mobile phone models, power requirements for the hardware, or any other information related to the hardware, or type of hardware, used to conduct communication within the mobile network 104. The metadata may be received from the mobile device 110, the network authority 108, and/or any other source that has access to the metadata.

The examples noted in table 1 are intended to describe non-limiting examples of the infrastructure performance indicator 112. In general, the infrastructure performance indicator 112 may include any information that describes the operational performance of the hardware infrastructure 106 of the mobile network 104. Alternatively or in addition, the infrastructure performance indicator may include metadata descriptive the hardware devices of the hardware infrastructure, one or more mobile devices, or any combination thereof. In some examples, the operational performance may include, for example, a quality of communication between the hardware infrastructure 106 and devices served by the hardware infrastructure 106, a quantity of communication handled by the hardware infrastructure 106, information describing user experience with the hardware infrastructure 106, information related to management of the hardware infrastructure 106, information related to maintenance of the hardware infrastructure 106, or any other information related how effectively data is communicated to, from, or within the hardware infrastructure 106. Moreover, the infrastructure performance indicator 112 may include multiple collections of information that correspond to any example of performance indicators described herein.

In some examples, the data collector may receive one or more infrastructure performance indicator 112 from devices communicating within the mobile network. Alternatively or in addition, the reward manager 124 may determine the infrastructure performance indicator 112. For example, the infrastructure performance indicator 112 may include an infrastructure operation determination. The infrastructure operation determination may include a determination related to the current or anticipated operation of the hardware infrastructure 106. For example, the infrastructure operation determination may include a determination that a portion of the hardware infrastructure 106 is operating outside of normal operating conditions. Alternatively or in addition, the infrastructure operation determination may include a determination that the network loads placed on the hardware infrastructure 106 are greater than a threshold value. In some examples, the infrastructure operation determination may include a determination that maintenance will occur at a particular time. Alternatively or in addition, the infrastructure operation determination may include any determination related to the present or anticipated performance of the hardware infrastructure 106 based on information acquired from devices operating within the mobile network 107.

The reward 116 may include any asset or action that adds value to a recipient. The reward 116 may include a representation of a physical or virtual asset. Alternatively or in addition, the reward 116 may include an assignment of ownership of the physical or virtual asset to the recipient. In some examples, the reward 116 may include a discount, a coupon, a credit, or any other type of promotion. Alternatively or in addition, the reward 116 may be related to a service. For example, the reward 116 may include free or discounted minutes, messages, data, or other type of service offering provided by a carrier of the mobile network 104. In other examples, the reward 116 may include incentive offerings provided by commercial enterprises. For example, the load manager 102 may be in communication with retailers, banks, or any other business to receive and/or assign the reward 116 to user accounts managed by, or external to, the load manager 102. For example a rewards can be an increased amount of Mobile Data traffic that customer can leverage in a certain period of time.

The reward record 114 may include a digital representation of the reward 116. For example, the reward record 114 may include information related to the reward 116 and/or the target geographic location 118 that is generated, stored, and/or communicated by the load manager 102. Alternatively or in addition, the reward record 114 may link the reward 116 with other information including, for example, the target geographic location 118. The reward record 114 may include identifiers of the reward 116 and/or the target geographic location 118. For example, the reward record 114 may include primary or secondary keys stored in a memory. In other examples, the reward 116 may be associated with an identifier stored on a third party system (not shown in FIG. 1). The reward record 114 may include the identifier of the reward 116. Alternatively or in addition, the reward record 114 may include the reward 116 or instructions to assign ownership of the reward 116.

The load manager 102 may include a performance collector 122 and a reward manager 124. The performance collector 122 may communicate with the mobile network 104 to receive information related to the operational performance of the hardware infrastructure 106. For example, performance collector 122 may receive the infrastructure performance indicator 112. In some examples, the performance collector 122 may receive the infrastructure performance indicator 112 from one or more mobile devices in wireless communication with the hardware infrastructure 106. Alternatively or in addition, the performance collector 122 may receive the infrastructure performance indicator 112 from the network authority 108, devices within the hardware infrastructure 106, or any other source which may provide information related to the hardware infrastructure 106.

The reward manager 124 may manage rewards that incentive movement of mobile devices. For example, the reward manager 124 may analyze information related to the operational performance of the hardware infrastructure 106 to create, communicate, activate, deactivate, and/or destroy the reward record 114. In some examples, the reward manager 124 may create the reward 116. Alternatively or in addition, the reward manager 124 may receive the reward 116, or information related to the reward 116, from the network authority 108 or another external source. In some examples, the reward manager 114 may determine, based on the infrastructure performance indicator 112, the target geographic location 118 to associate with the reward 116. The reward manager 124 may periodically update the reward record 114 based the operational performance of the hardware infrastructure 106 or other information provided by the performance collector 122.

In some examples, the reward manager 124 may communicate information related to the reward record 114 to the mobile device 110. For example, the reward manager 124 may generate the reward instruction 120. The reward instruction 120 may include information descriptive of the reward 116 and/or the target geographic location 118. The reward manager 124 may instruct the mobile device 110 to display information indicative of the reward record 114 by communicating the reward instruction 120 to the mobile device 110. Alternatively or in addition, the reward manager 124 may communicate the reward instruction 120 and/or the reward record 114 to the mobile device 110 in response to queries from the mobile device 110.

The system 100 may include a database 126 to store information for managing rewards. For example, the database 126 may store the infrastructure performance indicator 112, a representation of the reward 116, a representation of the target geographic location 118, the reward record 114, and/or metadata received form the mobile network 104. In some examples, the performance collector 122 may perform mathematical analysis and store the results of the analysis in the database 126. The reward manager 124 may access the database 126 to create or communicate the reward record 114, the reward 116, and/or the target geographic location 118. In some examples, the reward manager 124 may store the reward record 114, or the reward instruction 120, in of the database 126. Alternatively or in addition, the reward manager 124 may provide access to the database 126. For example, the reward manager 124 may permit or prohibit mobile device 110 from accessing information related to the reward 116 in the database 126. The mobile device 110 may communicate with the database 126 directly or through the reward manager 124 to determine where and when to display information related to the reward 116.

In general, the load manager 102 may incentivize movement into, out of, or within one or more geographic area served by the hardware infrastructure 106, or portions thereof. The system may be implemented in various manners to promote the efficient intensification for movement of mobile devices.

In some examples the load manager 102 may communicate the infrastructure performance indicator 112 received and/or determined by the load manager 102 to a remote server. For example, the load manager 102 may communicate the infrastructure performance indicator 112 to the network authority 108. In other examples, the load manager 102 may communicate the infrastructure performance indicator to any remote server accessible by the load manager. Moreover, load manager 102 may communicate the reward record 114, the reward 116, the target geographic location 118, and any other information related to the reward 116 to the remote server.

Figure 2:
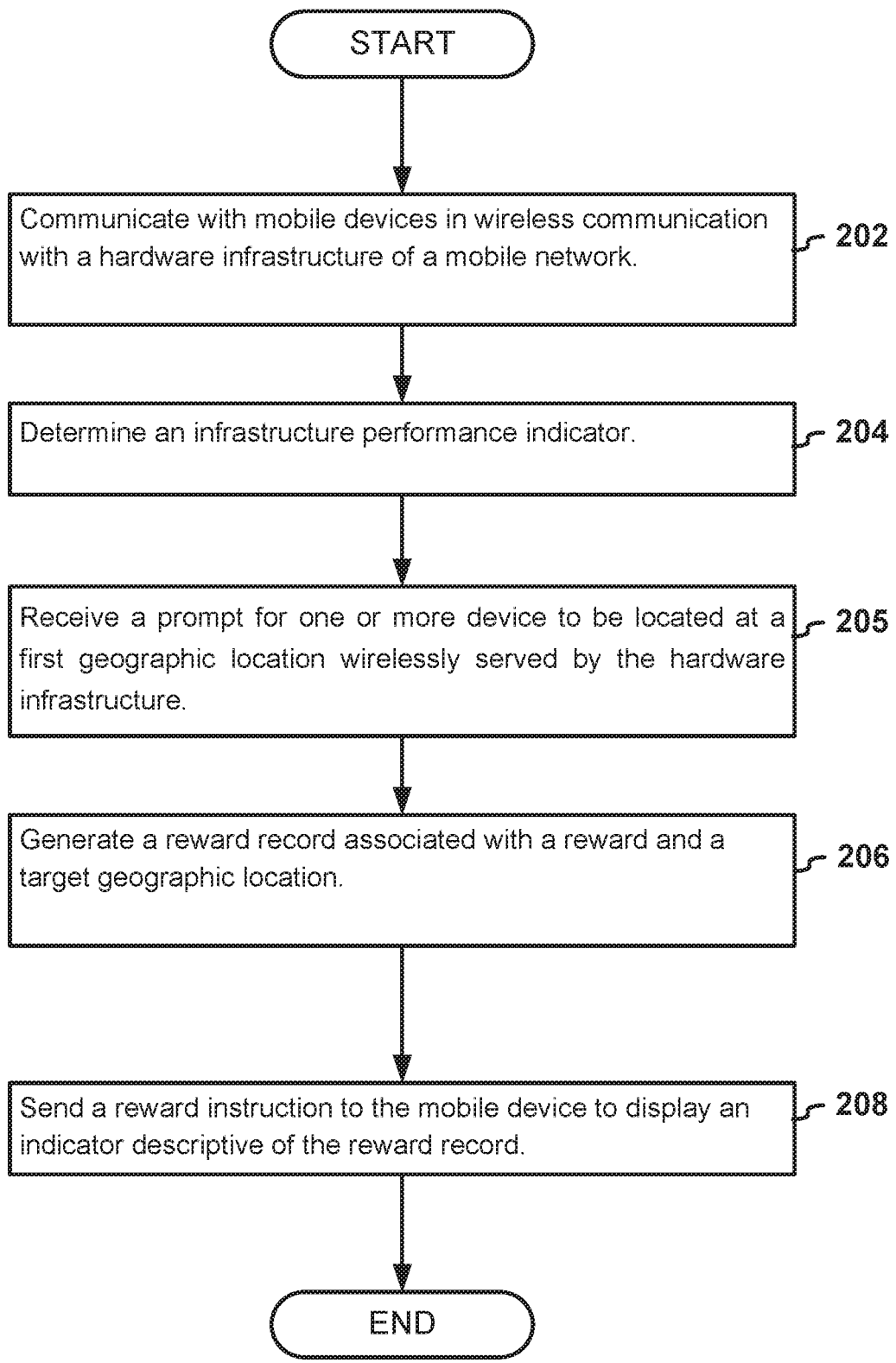
FIG. 2 illustrates a flow diagram of a first example of logic for a system.

FIG. 2 illustrates a flow diagram of a first example of the logic for the system 100. The performance collector 122 may communicate with mobile devices 110 in wireless communication with the hardware infrastructure 106 of the mobile network 104 (202). The mobile devices may include the mobile device 110. The mobile device 110 may include an application executing on the mobile device 110. The application may collect information generated by the mobile device 110 that is related to communication with the hardware infrastructure 106. For example, the mobile device 110 may collect the infrastructure performance indicator 112 and communicate the infrastructure performance indicator 112 to the performance collector 122. Alternatively or in addition, the mobile device 110 may send the metadata including, for example, location information, identification information, and/or any other kind of information related to the mobile device 110, the applications running on the mobile device 110, the user of the mobile device 110, and/or the operation of the hardware infrastructure 106 serving the mobile device 110.

The performance collector 122 may determine the infrastructure performance indicator 112 (204). In some examples, the performance collector 122 may receive the infrastructure performance indicator 112 from the mobile network 104. For example, the performance collector 122 may receive the infrastructure performance indicator 112 from the mobile device 110. Alternatively or in addition, the performance collector 122 may receive the infrastructure performance indicator 112 from the network authority 108. Alternatively or in addition, the performance collector 122 may collect information from the hardware infrastructure 106 and/or the mobile device 110 related to the mobile network 104. The reward manager 124 may analyze the information to determine the infrastructure performance indicator 112. For example, the infrastructure performance indicator 112 may include the infrastructure operation determination previously discussed. The infrastructure operation determination may include a determination related to a current or future operation of the hardware infrastructure 106 based on information collected from the hardware infrastructure 106 and/or devices communicating with the hardware infrastructure 106. It should be appreciated that the performance collector 122 may receive multiple performance indicators from multiple sources within or outside of the mobile network 104. For example, the infrastructure performance indicator 112 may be received from a management terminal in communication with the load manager 102.

The reward manager 124 may receive a prompt for one or more device to be located at a first geographic location wireless served by the hardware infrastructure (205). The prompt may include a message received by the reward manager 124. For example, the prompt may include a message received in response an interaction with a graphical user interface. For example, a terminal device may be in communication with the reward manager 124. The terminal device may send the prompt to the reward manager 124 that includes the first geographic location. The prompt may include the first geographic location. Alternatively or in addition, the prompt may include a geographic area. In addition, the prompt may include the target geographic location 118.

The reward manager 124 may generate, based on the one of the plurality of mobile devices being located at the first geographic location, the reward record 114 associated with the reward 116 and the target geographic location 118 (206). For example, the performance collector may receive a geographic location of the mobile device 110. The reward manager 124 may determine that the geographic location of the mobile device is located in the proximity of the first geographic location. In some examples, the prompt may include a geographic area and the reward manager may determine that the mobile device 110 is located within the geographic area.

In other examples, the reward manager may generate, based on an analysis of the infrastructure performance indicator, the reward record 114 associated with the reward 116 and a target geographic location 118. The analysis of the infrastructure performance indicator 112 may include any mathematical or logical evaluation of the infrastructure performance indicator 112. In some examples, the infrastructure performance indicator 112 may be evaluated with other information including, for example, other performance indicators, predetermined threshold values, and/or logic that triggers events. Alternatively or in addition, the analysis of the infrastructure performance indicator 112 may include a determination of the operational performance or health of the hardware infrastructure 106. For example, the reward manager 124 may determine that the hardware infrastructure 106 is operating outside of a predetermined operating range.

Based on the analysis, the reward manager 124 may generate the reward record 114. The reward record 114 may include an association between the reward 116 and the target geographic location 118. In some examples, the reward manager 124 may determine the target geographic location 118 based on the analysis of the infrastructure performance indicator 112.

The reward manager 124 may send the reward instruction 120 to the mobile device 110 to display an indicator descriptive of the reward record 114 (208). In some examples, the reward manager 124 may send the reward instruction 120 in response to the analysis of the infrastructure performance indicator 112 and/or the metadata collected from the mobile network 104. For example, the reward manager 124 may identify problems in a portion of the hardware infrastructure 106. The reward manager 124 identify mobile devices within a geographic area served by the portion of the hardware infrastructure 106. The reward manager 124 may send the reward instruction 120 to the mobile devices within the geographic area.

It should be appreciated that the reward manager 124 can send the reward instruction 120 via any communication method. For example, the reward manager 124 may send the reward instruction 120 to the mobile device 110 via a push notification service. Alternatively or in addition, the reward manager may receive a query from an application executing on the mobile device 110 and response to the query by sending the reward instruction 120.

The flow logic illustrated in FIG. 2 may include additional or fewer steps. For example, the flow logic in FIG. 2 may include the step of determining, based on the analysis of the infrastructure performance indicator 112, the target geographic location 118. In one example, the reward manager 124 may determine a concentration of mobile devices in a geographic area served by the hardware infrastructure 106. The reward manager may identify the target geographic location 118 outside of the geographic area.

The reward manager may analyze the infrastructure performance indicator 112 various ways to determine how to incentive movement into, out of, or within the geographic area served by the hardware infrastructure 106, or portions thereof. For example, the infrastructure performance indicator may include a performance metric. The performance metric may include a metric descriptive of the operational performance of the hardware infrastructure. The performance metric may quantify any example of a performance indicator described herein.

Figure 3:
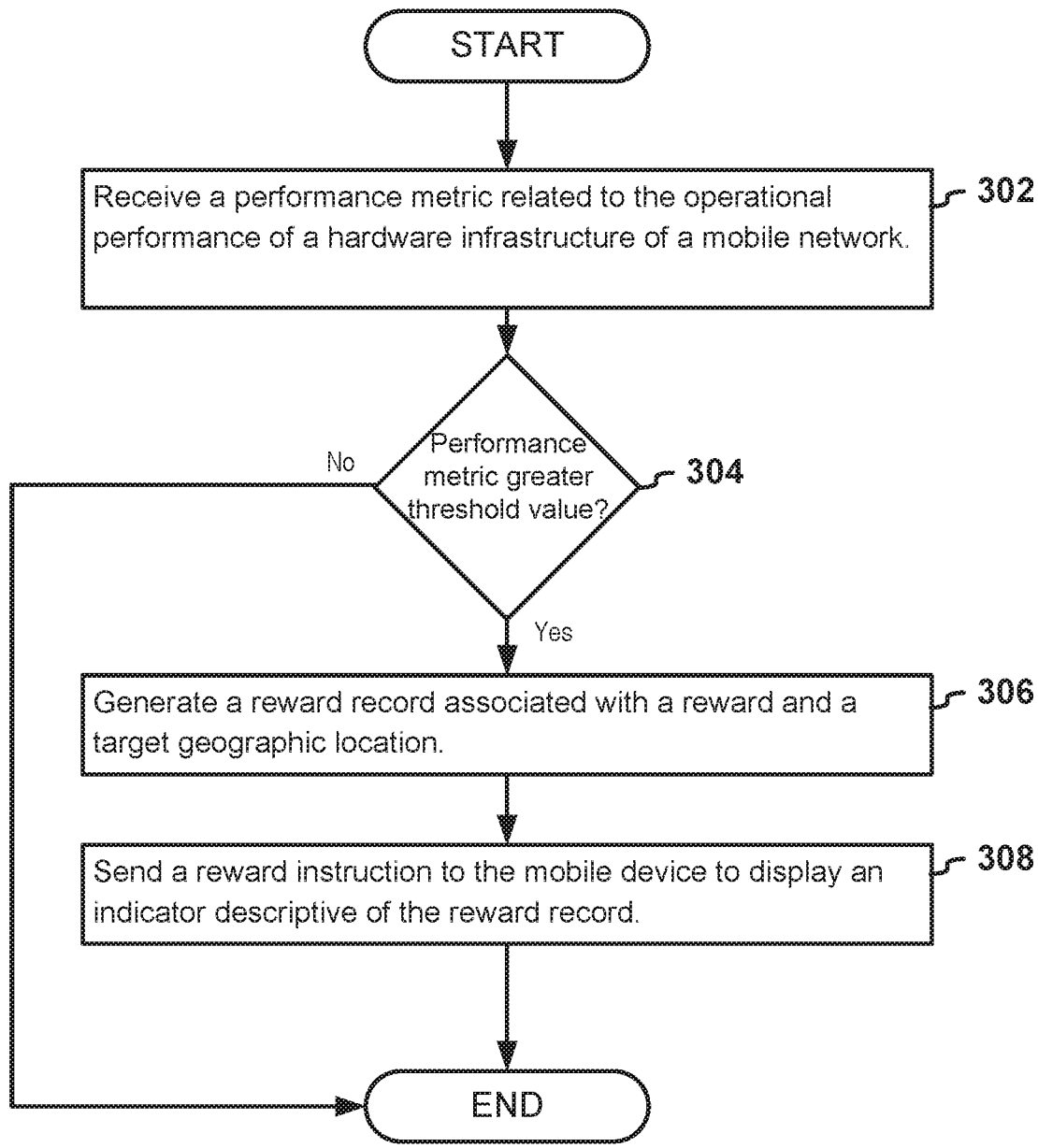
FIG. 3 illustrates a flow diagram of a second example of logic for a system.

FIG. 3 illustrates a flow diagram of a second example of the logic for the system 100. The performance collector 122 may receive a performance metric related to the operational performance of the mobile network 104 (302). The performance metric may be received from the mobile device 110, a device of the hardware infrastructure 106, the network authority 108, or any other device capable of monitoring the hardware infrastructure 106. In some examples, the reward manager may receive information related to the operation of the hardware infrastructure and subsequently determine the performance metric based on an analysis of the operation of the hardware infrastructure 106.

The reward manager may determine the performance metric is greater than a threshold value (304). In other examples, the reward manager may determine whether the performance metric is less than the threshold value and/or outside of a present range. For example, the performance metric may indicate a quantity of communication or a quality of communication over the hardware infrastructure 106. The threshold value may be representative of a maximum operating capacity, or a warning level corresponding to a maximum operating capacity of the hardware infrastructure 106. Alternatively or in addition, the threshold value may include any threshold that identifies or warns of operational inefficiencies in the hardware infrastructure 106. For example, the threshold value may include a number of devices within a coverage area of the mobile network, a current rate of information being transferred of the hardware infrastructure, an operating time of a device within the hardware infrastructure 106, a number of errors, or threshold value related to the operation of the hardware infrastructure 106. Alternatively or in addition, the threshold value may be a value provided via a management terminal in communication with the load manager 102.

In response to the performance metric being greater than the threshold value, the reward manager 124 may generate the reward record 114 associated with the reward 116 and the target geographic location 118 (306. The reward manager 124 may send the reward instruction 120 to the mobile device 110 to display the indicator descriptive of the reward record 114 (308). In some examples, the reward manager 124 may send the reward instruction 120 to the mobile device 110 in response to the performance metric being greater than or less than the threshold value and/or outside of a range of values.

In some examples, the reward manager 124 may cause ownership of the reward 116 to be assigned to the user of the mobile device 110. For example, the reward manager 124 may cause ownership of the reward 116 to be assigned when the mobile device 110 is within a predefined proximity of the target geographic location 118. Alternatively or in addition, the reward manager may cause ownership of the reward 116 to be assigned when the mobile device 110 enters a geographic area served by a specific portion of the hardware infrastructure 106. In other examples, the reward manager 124 may cause the reward 116 to be assigned when an application on the mobile device 110 sends a message indicating that the user of the mobile device 110 has interacted with a graphical representation of the reward record 114.

Figure 4:
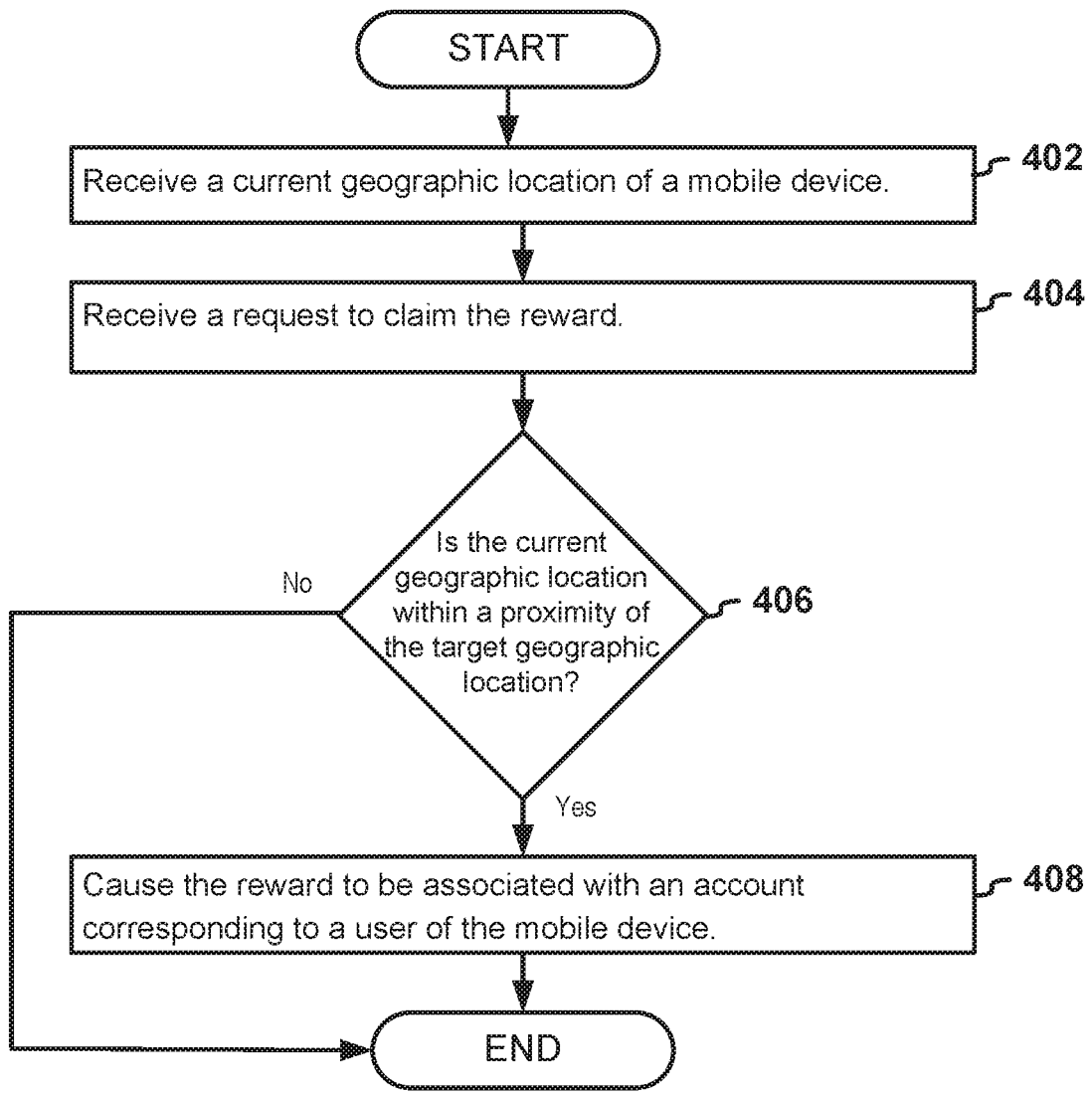
FIG. 4 illustrates a flow diagram of a third example of logic for a system.

FIG. 4 illustrates a flow diagram of a third example of the logic for the system 100. The reward manager 124 may receive a current geographic location of the mobile device 110 (402). For example, the mobile device 110 may communicate the current geographic location to the reward manager 124. Alternatively or in addition, the network authority 108 or another source may provide the current geographic location of the mobile device 110.

The reward manager 124 may receive a request to claim the reward (404). For example, the mobile device 110 may send a request to receive the reward. In some examples, the mobile device 110 may display the graphical representation in response to receiving the reward instruction 120 or otherwise detecting the existence of the reward record 114. In some examples, the mobile device 110 may display the graphical representation of the reward record 114 in an augmented reality application or some other game interface. In response to interacting with the graphical representation, the mobile device 110 may send the request to the reward manager 124. Alternatively or in addition, the mobile device 110 may send information to the reward manager 124 indicative of an interaction with a graphical or textual representation of the reward record 114.

The reward manager 124 may determine whether the current geographic location of the mobile device 110 is within a predefined proximity of the target geographic location 118 (406). In some examples, the predefined proximity may include a predefined distance to the target geographic location 118. The reward manager 124 may calculate a geographic distance between the target geographic location 118 and the current geographic location of the mobile device 110. Alternatively or in addition, the application on the mobile device 110 may determine the geographic distance and the reward manager 124 may receive the geographic distance from the mobile device 110.

In response to determining that the current geographic location of the mobile device 110 is within the proximity of the target geographic location 118, the reward manager 124 may cause the reward 116 to be associated with an account corresponding to the user of the mobile device 110 (408). The account may be associated with a user identifier of the application executing on the mobile device 110. Alternatively or in addition, an external system of a bank, retailer, or some other business may store the account.

The reward manager 124 may cause the reward 116 to be associated with the account. For example, the reward manager 124 may cause the transfer of a physical or virtual asset to the account of the user. Alternatively or in addition, the reward manager 124 may communicate with the network authority 108 or any other third party system that manages the account.

The reward record 114, the reward 116 and/or the target geographic location 118 may be created and/or managed according to instructions provided to the load manager 102. For example, a user may supply information related to the creation of rewards, locations for the rewards, and/or criteria for creating the reward, and/or criteria for communicating the reward. Based on the information provided by a user, the load manager may analyze the operation of the hardware infrastructure 106, target one or more mobile devices for movement, and communicate reward information to the mobile devices.

Figure 5:
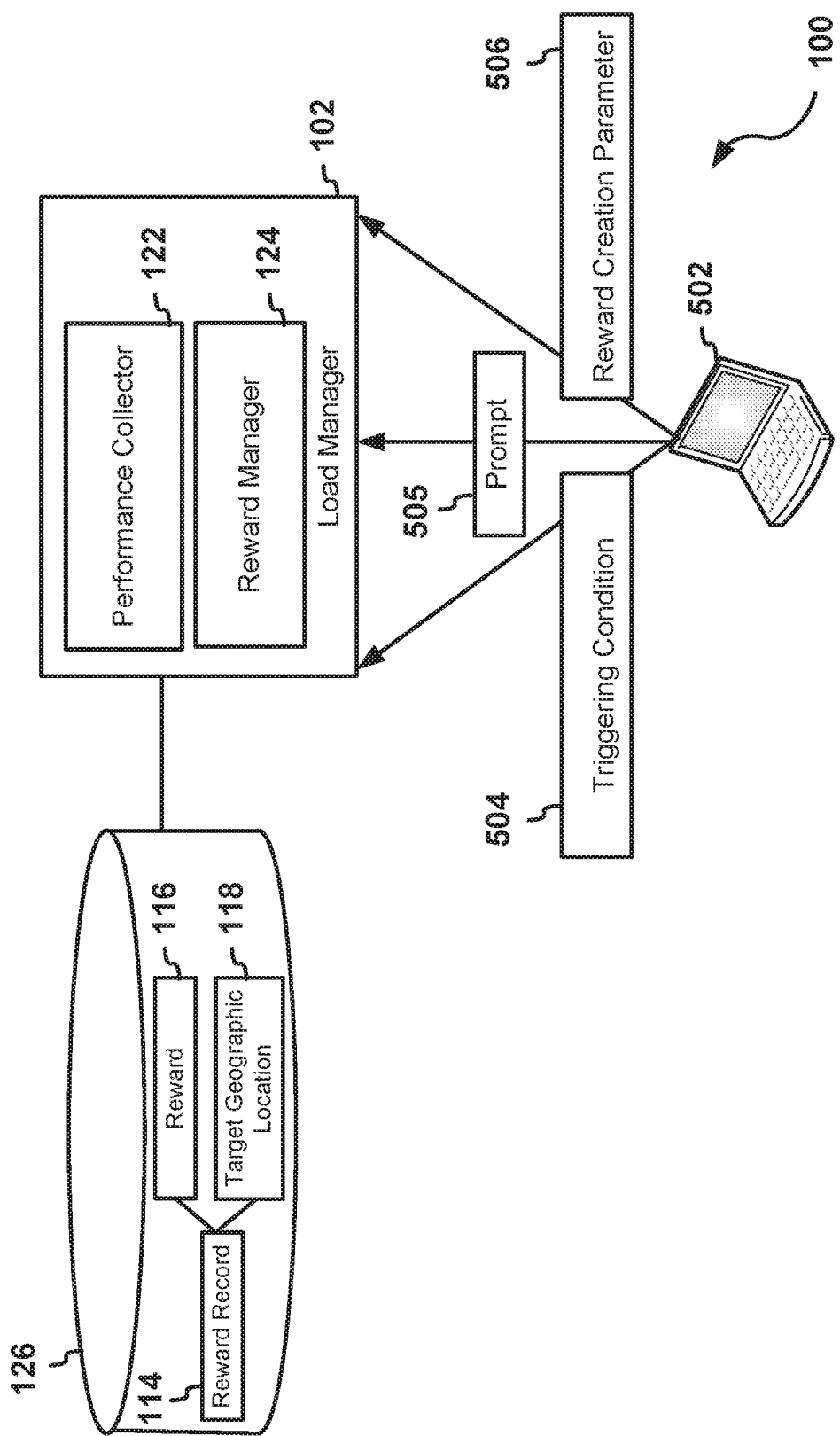
FIG. 5 illustrates an example of a system including a terminal device.

FIG. 5 illustrates an example of the system 100 including a terminal device 502. The terminal device 502 may be in communication with the load manager 102. The terminal device 502 may display a management interface. In some examples, the load manager 102 may provide the management interface to the terminal device 502 via a web page or other display information communicated to the terminal device 502. The terminal device 502 may communicate information to the load manager 102 related to the creation, management, and criteria managing rewards to incentive movement of mobile devices within or out of the service areas provided by the hardware infrastructure 106.

The terminal device 502 may communicate a triggering condition 504 to the reward manager 124. The triggering condition 504 may include criteria that establishes when the reward record 114 should be created and/or destroyed. Alternatively or in addition, the triggering condition 504 may include criteria that establishes when the reward instruction 120, the reward record 114, and/or any other information related to the reward 116 are communicated to mobile devices. In some examples, the triggering condition 504 may include logic that is used to evaluate the infrastructure performance indicators. For example, the triggering condition 504 may include logical comparisons, a range of metrics, rules, and/or any other information that may use to determine when to create, destroy and/or communicate the reward 116 and/or information related to the reward 116.

In some examples, the terminal device 502 may communicate a prompt to the reward manager 124. The prompt 505 may include an initial geographic location and a target geographic location. The reward manager 124 may generate the reward record 114 and/or the reward 116. The reward record 114 and/or the reward 116 may be associated with the target geographic location 118. The reward manager 124 may communicate information related to the reward record 116 to one or more mobile devices at, or in the vicinity of, the initial geographic location. Alternatively or in addition, the prompt 505 may include an initial geographic area and the reward manager 124 may communicate the reward information to one or more mobile device within the geographic area. In some examples, the reward manager 502 may prohibit communication and/or access to the reward record 114 for mobile devices outside of the initial geographic area and/or not located in proximity to the initial geographic location. In some examples, the prompt 505 may be received by the reward manager 124 in response to a user interaction with a graphical user interface on the terminal device 502. The graphical user interface may be provide by the reward manager 124. In some examples, the graphical user interface may include a web page. Alternatively or in addition, the graphical user interface may be based on any protocol for rendering text and images.

Additionally or alternatively, the management terminal may communicate a reward creation parameter 506 to the load manager 102. The reward creation parameter 506 may include information that defines how to create the reward record 114, the reward 116 and/or the target geographic location 118. Alternatively or in addition, the reward creation parameter 506 may include the attributes of the reward 116, rules for creating the reward record 114, the provider of the reward 116, rules related to assigning the reward 114, and/or any other information related to the reward 116. In some examples, the reward creation parameter 506 may include an identifier of the target geographic location 118 and/or a target geographic area.

Figure 6:
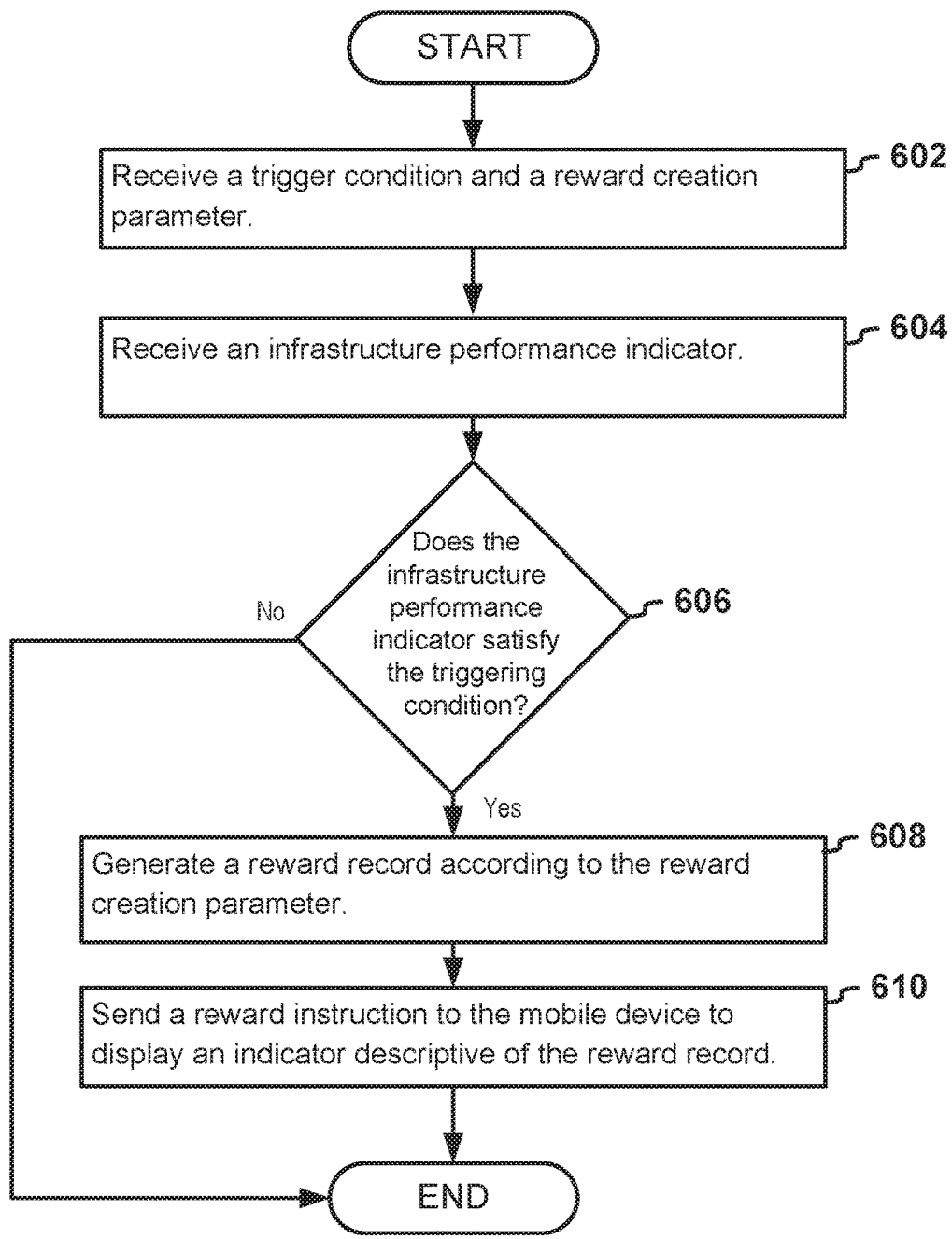
FIG. 6 illustrates a flow diagram of a fourth example of logic for a system.

FIG. 6 illustrates a flow diagram of a fourth example of the logic for the system 100. The reward manager 124 may receive the triggering condition 504 and the reward creation parameter 506 (602). The triggering condition 504 and the reward creation parameter 506 may be received from the terminal device 502 or any other source. In some examples, the reward manager 124 may receive the triggering condition 504 without the reward creation parameter 506. Alternatively or in addition, the reward manager 124 may receive the reward creation parameter 506 without receiving the triggering condition 504. In other examples, the reward manager 124 may receive the triggering condition 504 and the reward creation parameter 506 in any order.

The performance collector 122 may receive the infrastructure performance indicator 112 (604). The reward manager 124 may determine whether the triggering condition 504 is satisfies based on the infrastructure performance indicator 112 (606). For example, infrastructure performance indicator 112 may be evaluated with the triggering condition 504 to determine whether criteria specified by the triggering condition 504 is met. In one example, the infrastructure performance indicator 112 may include a metric and the triggering condition 504 may include a logical or mathematical comparison of the metric with a predefined value.

In response to the satisfaction of the triggering condition 504, the reward manager 124 may generate the reward record 114 according to the reward creation parameter 506 (608). For example, the reward creation parameter 506 may include an attribute that is used to generate the reward record 114. Alternatively or in addition, the reward creation parameter 506 may include a rule or a set of rules used to create the reward record 114 and associate the reward record 114 with the target geographic location 118 and/or the reward 116.

The reward manager 124 may send the reward instruction 120 to the mobile device 110 to display the indicator descriptive of the reward record 114 (610). In some examples, reward manager 124 may send the reward instruction 120 to the mobile device 110 in response to the triggering condition 504 being satisfied. Alternatively or in addition, the reward manager 124 may cause information representative of the reward record 114 to be displayed on the mobile device 110.

In some examples, the load manager 102 may incentive movement within specific portions of the geographic areas served by the hardware infrastructure 106 in order to manage loads on specific portions of the hardware infrastructure 106. By targeting specific mobiles devices to incentivize movement to specific coverage areas within the mobile network 104, the load manager 102 may manage loads placed on the mobile network 104 and monitor operation of the mobile network 104.

Figure 7:
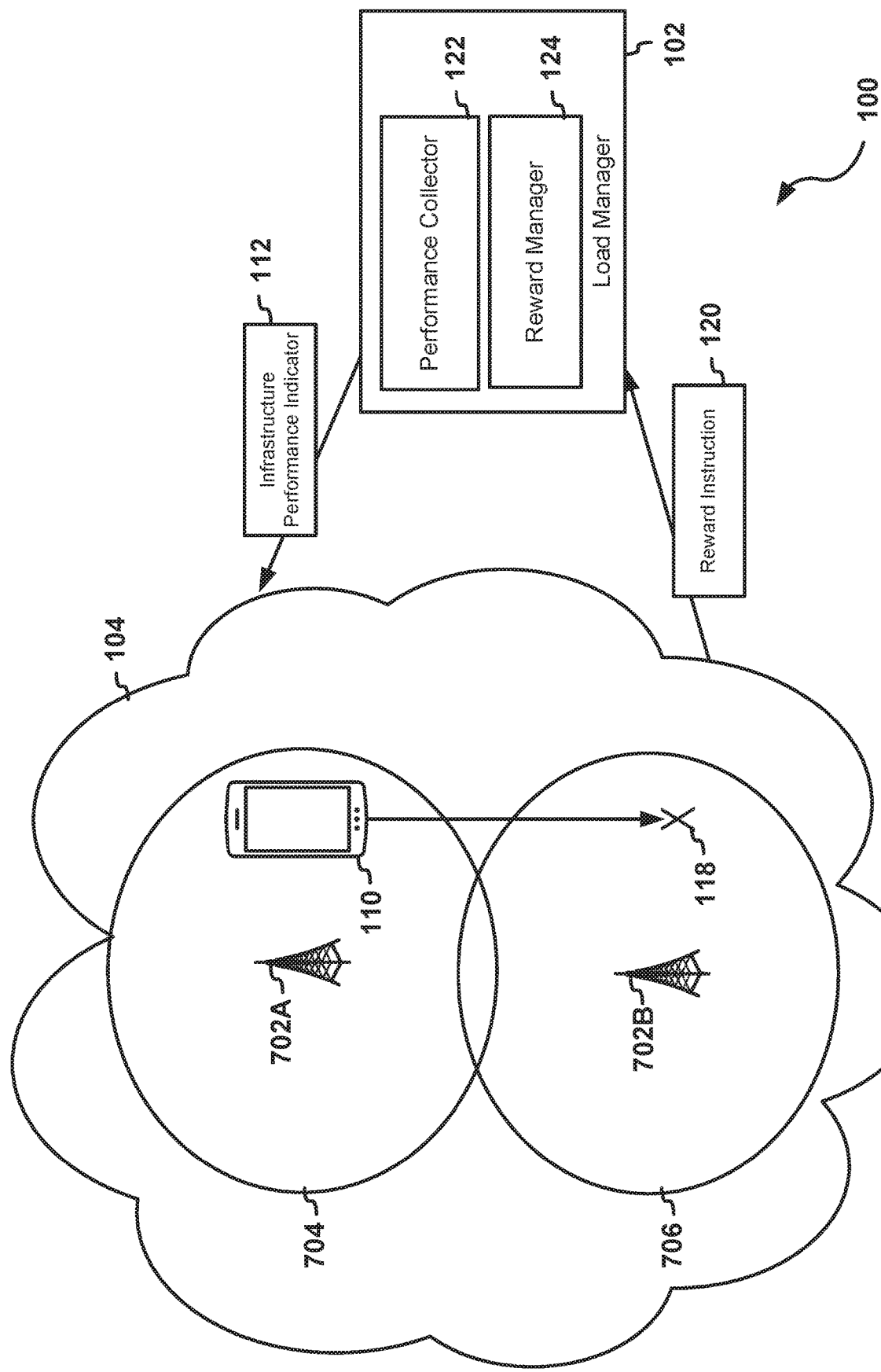
FIG. 7 illustrates an example of a system.

FIG. 7 illustrates an example of the system 100. The hardware infrastructure 106 may be divided into portions 702. For example, the hardware infrastructure 106 may include a first portion 702A and a second portion 702B. The first portion 702A of the hardware infrastructure 106 may serve a first geographic area 704 and the second portion 702B of the hardware infrastructure 106 may serve a second geographic area 706. A third geographic area may be served by both the first portion 702A of the hardware infrastructure 106 and the second portion.

Each of the portions 702 of the hardware infrastructure 106 may include hardware devices or circuitry to enable communication within the mobile network 104. The first portion 702A of the hardware infrastructure 106 may include hardware devices or circuitry that enables wireless communication separate for the second portion 702B of the hardware infrastructure 106. For example, the first portion 702A of the hardware infrastructure 106 may include a first cellular tower and the second portion 702B of the hardware infrastructure 106 may include a second cellular tower.

The performance collector 122 may identify which portion of the hardware infrastructure 106 the infrastructure performance indicator 112 describes. For example, the infrastructure performance indicator 112 may describe the operational performance of the first portion 702A of the hardware infrastructure 106 but not the second portion 702B of the hardware infrastructure 106. Alternatively or in addition, the infrastructure performance indicator 112 may describe the operational performance of the hardware infrastructure 106 serving the first geographic area 704, the second geographic area 706, or any combination thereof.

The reward manager 124 may analyze the infrastructure performance indicator to determine how to influence movement of the mobile device 110 within the geographic areas served by the hardware infrastructure 106. The reward manager 124 may manage loads placed in the portions 702 of the hardware infrastructure 106 by incentivizing movement within the geographic areas served by the hardware infrastructure 106. For example, the reward manager 124 may generate rewards which incentive movement of the mobile device 110 from the first geographic area 704 to the target geographical location 118 in the second geographical area 706.

In some example, one or more of the portions 702 of the hardware infrastructure 106 may include compromised hardware. The compromise hardware may include devices in the hardware infrastructure 106 that deteriorate quality of service provided by the hardware infrastructure 106. For example, the compromised hardware may include hardware that is damaged, overloaded with networking traffic, malfunctioning, or otherwise not operating within a predefined specification. The reward manager 124 may incentive movement of mobile devices outside of the geographic area served by a portion of the hardware infrastructure 106 that includes the compromised hardware.

The reward manager 124 may efficiently manage rewards by controlling access to the reward information. For example, the reward manager 124 may be queried for reward records that are applicable to one or more mobile devices. In other examples, the reward manager 124 may push the reward records, or information related to the reward records, to the one or more mobile devices. The reward manager 124 may determine which mobile device may receive information related the reward records.

Figure 8:
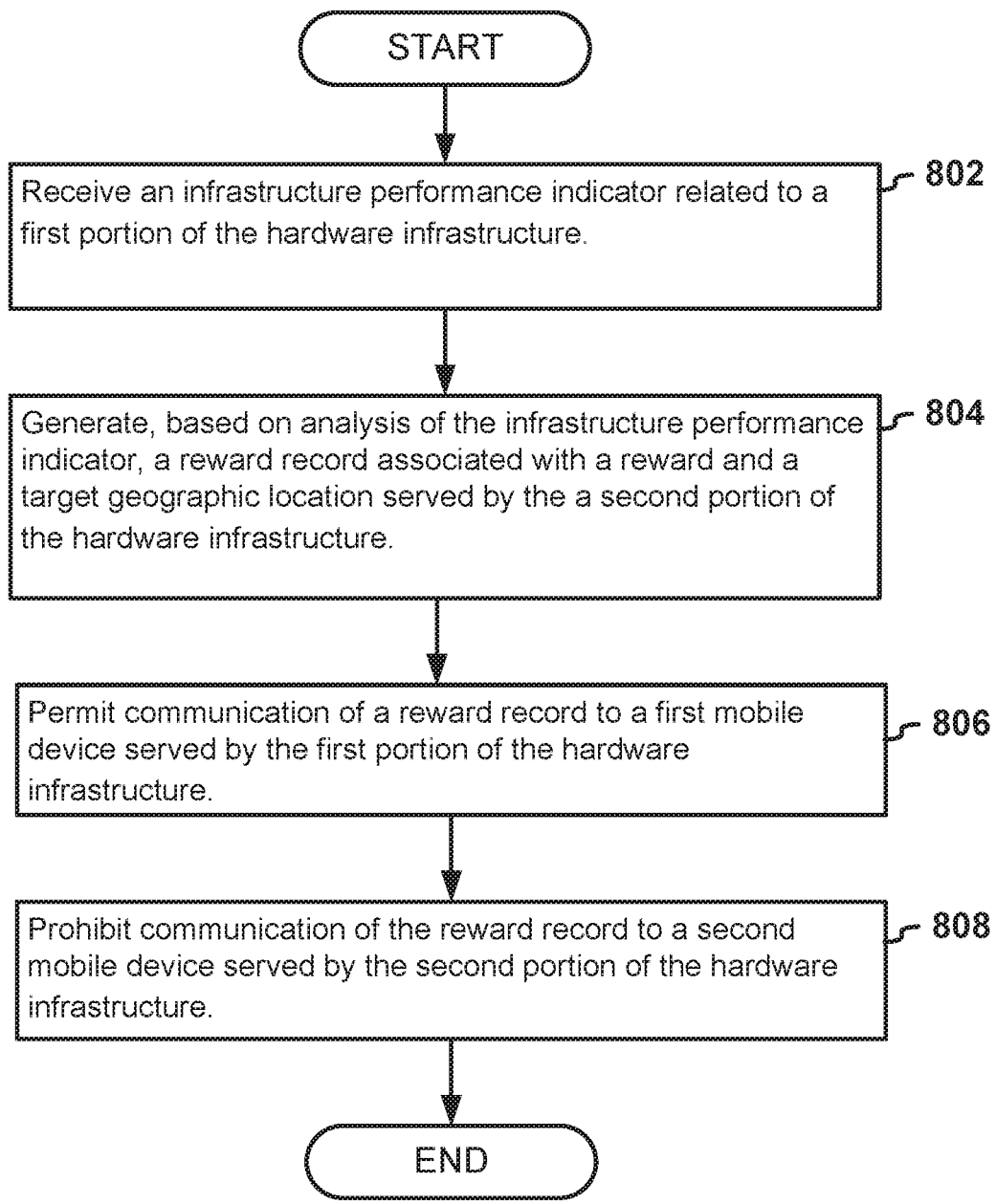
FIG. 8 illustrates a flow diagram of a fifth example of logic for a system.

FIG. 8 illustrates a flow diagram of a fifth example of the logic for the system 100. The performance collector 122 may receive an infrastructure performance indicator 112 related to a first portion 702A of the hardware infrastructure 106 (802). For example, infrastructure performance indicator 112 may be received from the mobile device 110 in wireless communication with the first portion 702A of the hardware infrastructure 106. Alternatively or in addition, the mobile device 110 may be located within the first geographic area 704 served by the first portion 702A of the hardware infrastructure 106. The infrastructure performance indicator 112 may describe the operational performance of the first portion 702A of the hardware infrastructure 106. For example, the infrastructure performance indicator 112 may describe the quantity or quality of communication between the mobile device 110 and networking devices included in the first portion 702A of the hardware infrastructure 106.

The reward manager 124 may generate, based on analysis of the infrastructure performance indicator 112, the reward record 114 associated with the reward 116 and the target geographic location 118 served by the second portion 702B of the hardware infrastructure 106 (804). The target geographic location 118 may include a geographic location that is within a geographic area served by the hardware infrastructure 106. The reward 116 may incentive the mobile device 110 to move away from the first geographic area 704 served by the first portion 702A of the hardware infrastructure 106 to the second geographic area 706 served by the second portion 702B of the hardware infrastructure 106.

The reward manager 124 may permit communication of the reward record 114 to the first mobile device served by the first portion 702A of the hardware infrastructure 106 (806). For example, the reward manager 124 may receive location information and identification information from the first mobile device. The location information may include GPS coordinates or the triangulated position of the mobile device 110 within the mobile network 104. Alternatively or in addition, the reward manager 124 may communicate with the network authority 108 to receive the current geographic location of the first mobile device 110. To incentive the first mobile device to move out of the first geographic area 704 served by the first portion 702A of the hardware infrastructure 106, the reward manager 124 may permit communication of the reward record 114, or information related to the reward 116, to the first mobile device. Alternatively or in addition, the reward manager 124 may communicate the reward instruction 120 to the first mobile device.

The reward manager 124 may prohibit communication of the reward record 114, or information related to the reward record 114, to a second mobile device served by the second portion 702B of the hardware infrastructure 106 (808). For example, the rewards may be intended to incentivize users to move mobile devices outside of the first geographic area 704. Accordingly, it may be inefficient to communicate reward information to mobile devices already located outside of the first geographic area 704. Accordingly, the reward manager 124 may block, prohibit, or otherwise may make unavailable the reward record 114, or information related to the reward record 114, to mobile devices outside of the first geographic area 704.

In some examples, rewards may be utilized to incentive users to move mobile devices to a geographic area served by a portion hardware infrastructure in order to collect information related to the operational performance of a portion of the hardware infrastructure 106 serving a particular geographic area.

Figure 9:
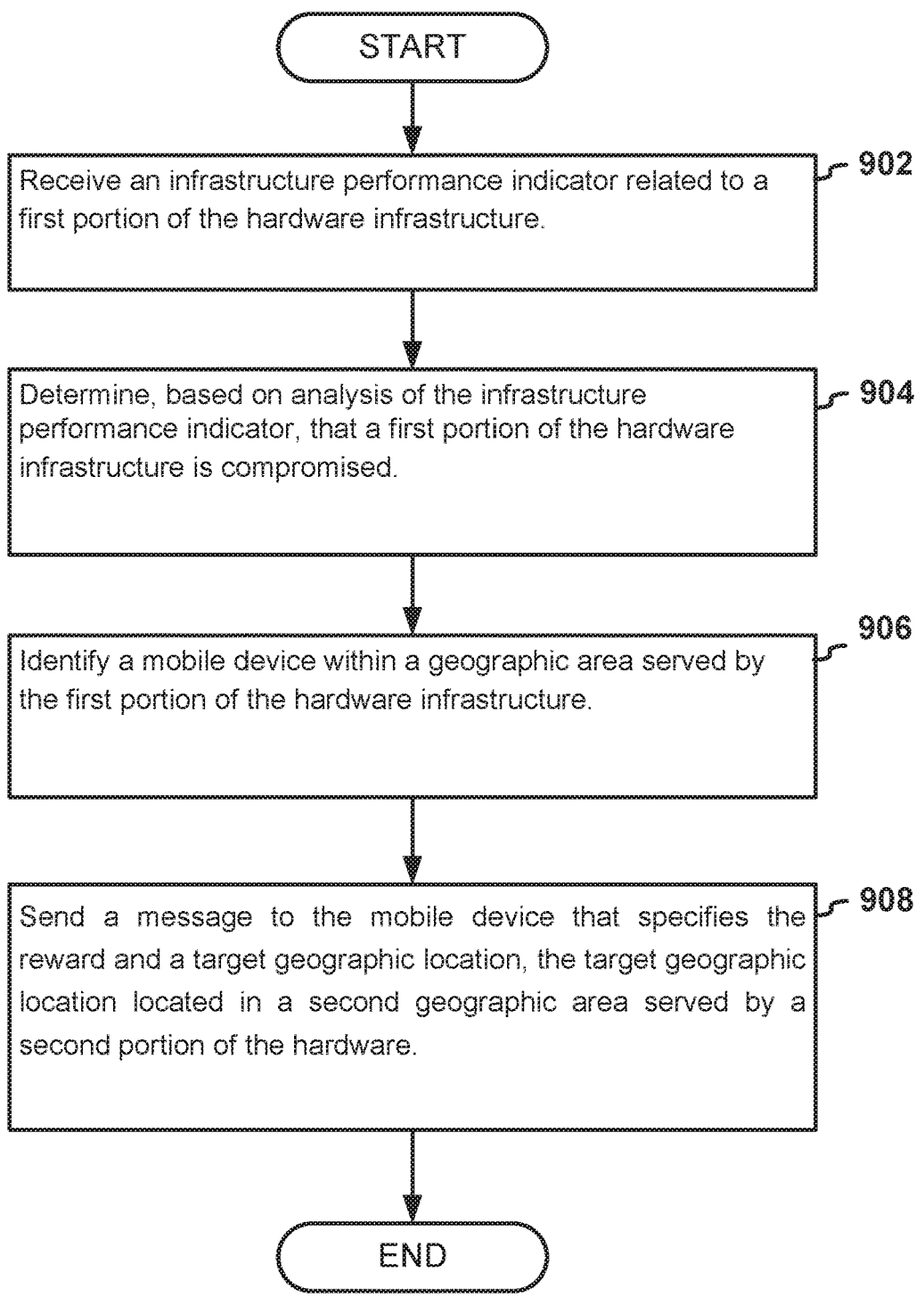
FIG. 9 illustrates a flow diagram of a sixth example of logic for a system.

FIG. 9 illustrates a flow diagram of a sixth example of the logic for the system 100. The performance collector 122 may receive an infrastructure performance indicator 112 (902). The reward manager 124 may determine, based on analysis of the infrastructure performance indicator 112, that the first portion 702A of the hardware infrastructure 106 is compromised. For example, the reward manager may determine that the first portion 702A of the hardware infrastructure 106 includes compromised networking hardware (904). In some examples, the reward manager 124 may compare the infrastructure performance indicator 112 with a triggering condition 504, metadata related to the hardware infrastructure 106, or any other information related to the operational performance of the hardware infrastructure 106. Alternatively or in addition, the reward manager 124 may perform a statistical analysis with the infrastructure performance indicator 112 to identify, for example, trends, correlations, and/or variances in the operation of the hardware infrastructure 106. In some examples, the infrastructure performance indicator 112 may provide information from the network authority 108, or some other source, that indicates an error condition related to the hardware infrastructure 106.

The reward manager 124 may identify the mobile device 110 within a first geographic area 704 served by the first portion 702A of the hardware infrastructure 106 (906). For example, the reward manager may receive metadata related to the mobile device 110 including, for example, current location information and identifying information. The reward manager 124 may send a message to the mobile device 110 that specifies the reward 116 and the target geographic location 118, the target geographic location 118 may be located in the second geographic area 706 served by the second portion 702B of the hardware infrastructure 106 (908). The message may include the reward instruction 120 as described herein. In some examples, the reward manager 124 may generate the reward record 114 before sending the message. Alternatively or in addition, the reward manager 124 may send the message to the mobile device in response to detection that the first portion of the hardware infrastructure is compromised.

Figure 10:
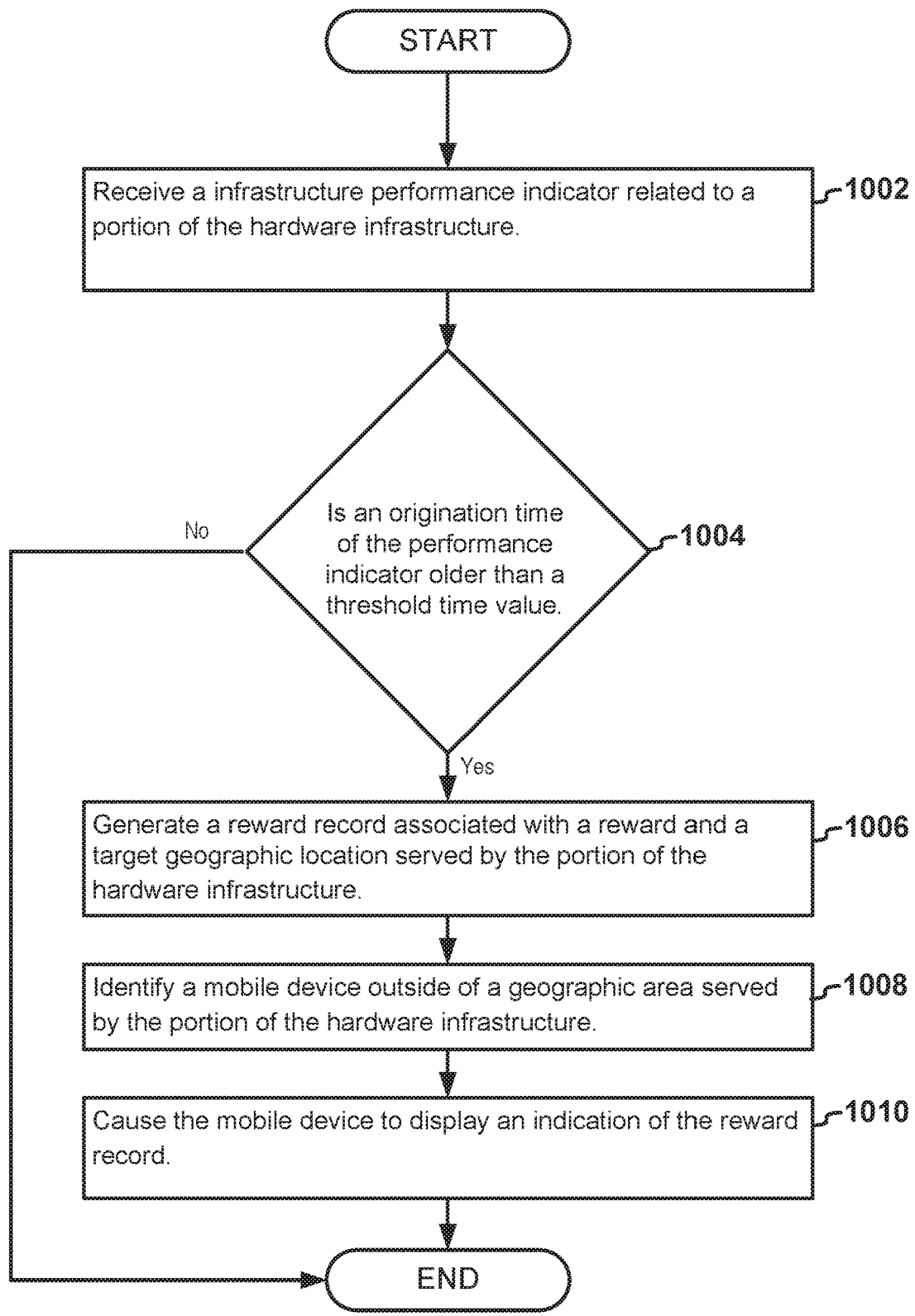
FIG. 10 illustrates a flow diagram of a seventh example of the logic for a system.

FIG. 10 illustrates a flow diagram of a seventh example of the logic for the system 100. The performance collector 122 may receive an infrastructure performance indicator 112 related to a portion of the hardware infrastructure 106 (1002). The portion of the hardware infrastructure 106 may serve a geographic area. In some examples, infrastructure performance indicators may be old or outdated.

The reward manager 124 may determine whether an origination time of the infrastructure performance indicator 112 is older than a threshold value (1004). The origination time may include, for example, a time the infrastructure performance indicator 112 was received. Alternatively, the origination time may include a time the infrastructure performance indicator 112 was created or communicated by any source.

In response to the origination time of the infrastructure performance indicator 112 being older than the threshold time value, the reward manager 124 may generate the reward record 114 associated the target geographic location 118 served by the portion of the hardware infrastructure 106 (1006). The reward manager 124 may identify the mobile device 110 outside of the geographic area served by the portion of the hardware infrastructure 106 (1008). For example, the reward manager may analyze metadata, including location information and identification information, related to the mobile device 110 to identify the mobile device outside of the geographic area. Alternatively or in addition, the network authority 108, or some other source, may provide information to the reward manager 124 that associates the mobile device with the second geographic area 706 and/or the second portion 702B of the hardware infrastructure.

The reward manager 124 may cause the mobile device 110 to display an indication of the reward record 114. For example, the reward manager 124 may send the reward instruction to the mobile device 110. Accordingly, the reward manager 124 may incentivize users of the mobile device 110 that are located outside of a geographic area served by a portion of the hardware infrastructure 106 to move the mobile devices within the geographic area.

In some examples, the mobile network 104 may undergo maintenance or be subject to other events that may result in down time or reduce the ability of the hardware infrastructure 106 to handle network loads. The load manager 102 may incentive movement of mobile devices based on anticipated events related to hardware infrastructure 106.

Figure 11:
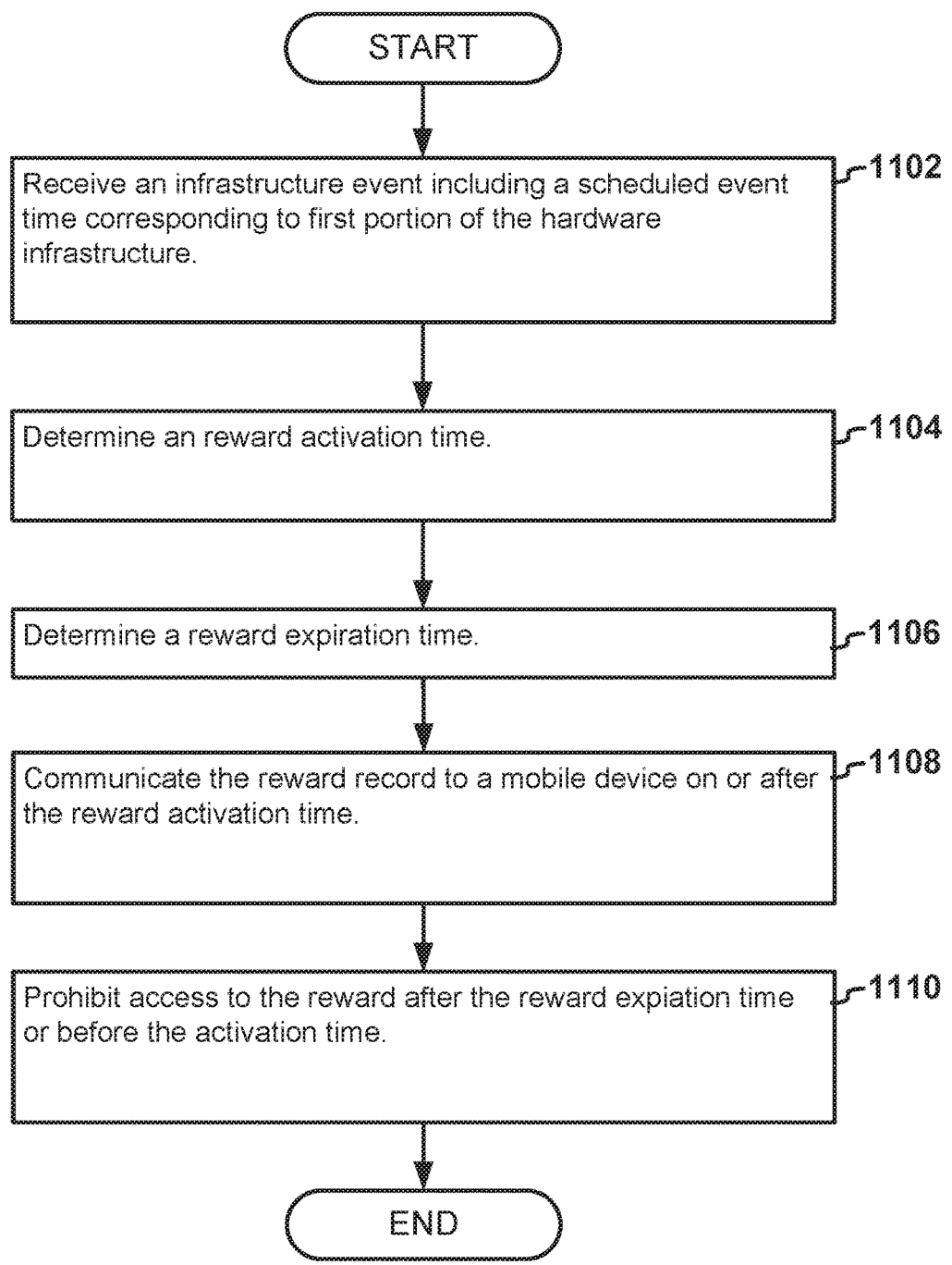
FIG. 11 illustrates a flow diagram of an eight example of logic for s system.

FIG. 11 illustrates a flow diagram of an eighth example of the logic for the system 100. The performance collector 122 may receive an infrastructure event including a scheduled event time corresponding to the first portion 702A of the hardware infrastructure 106 (1102). The scheduled time may include a scheduled start time and/or stop time for of the event. For example, the scheduled time may include a scheduled time for maintenance of the hardware infrastructure 106. Alternatively or in addition, the scheduled time may include a scheduled time for tests that may disrupt operation of the hardware infrastructure 106.

The reward manager 124 may determine a reward activation time (1104). The reward activation time may include a time that the reward 116 may become accessible to the mobile device 110. For example, the reward activation time may include a time that the reward record 114 should be created and/or communicated. Alternatively or in addition, the activation time may include a time that the reward instruction 120, or any other information related to the reward 116, should be created and/or communicated. The reward activation time may be based on the scheduled time. In some examples, the reward activation time may be offset from the scheduled time. For example, the reward activation time may be before the scheduled start of maintenance to allow sufficient time for movement of mobile devices before the maintenance begins.

The reward manager 124 may determine a reward expiration time (1106). The reward expiration time may include a time that the reward 116 may become inaccessible to the mobile device 110. For example, the reward expiration time may include a time that the reward record 114 is no longer accessible by the mobile device 110. In some examples, the reward instruction may be communicated to the mobile device 110 before the reward has expired. The reward manager 124 may prohibit the mobile device from claiming the reward on or after the reward expiration time.

The reward manager 124 may communicate the reward 116 to the mobile device 110 on or after the reward activation time (1108). For example, determine that a current time is greater or equal to the reward activation time. The reward manager 114 may communicate information related to the reward 116 to the mobile device 110 in on or after the reward activation time. Alternatively or in addition, the reward manager 124 may receive a request from the mobile device 110 to access the reward. The reward manager 124 may permit access to the reward 116 on or after the reward activation time.

The reward manager 124 may prohibit access to the reward 116 after the reward expiration time or before the activation time (1110). For example, the reward manager 124 may determine the current time is greater than the reward expiation time. The reward manager 124 may communicate a message to the mobile device 110 indicating that the reward has expired. In some examples, the reward manager 124 may communicate the message in response to a request by the mobile device 110 to access the reward. Alternatively or in addition, the reward manager 124 may prohibit communication of the reward instruction 120 before the activation time or after the expiration time.

The logic illustrated in the flow diagrams described herein may include additional, different, or fewer operations than illustrated. The operations illustrated may be performed in an order different than illustrated.

Figure 12:
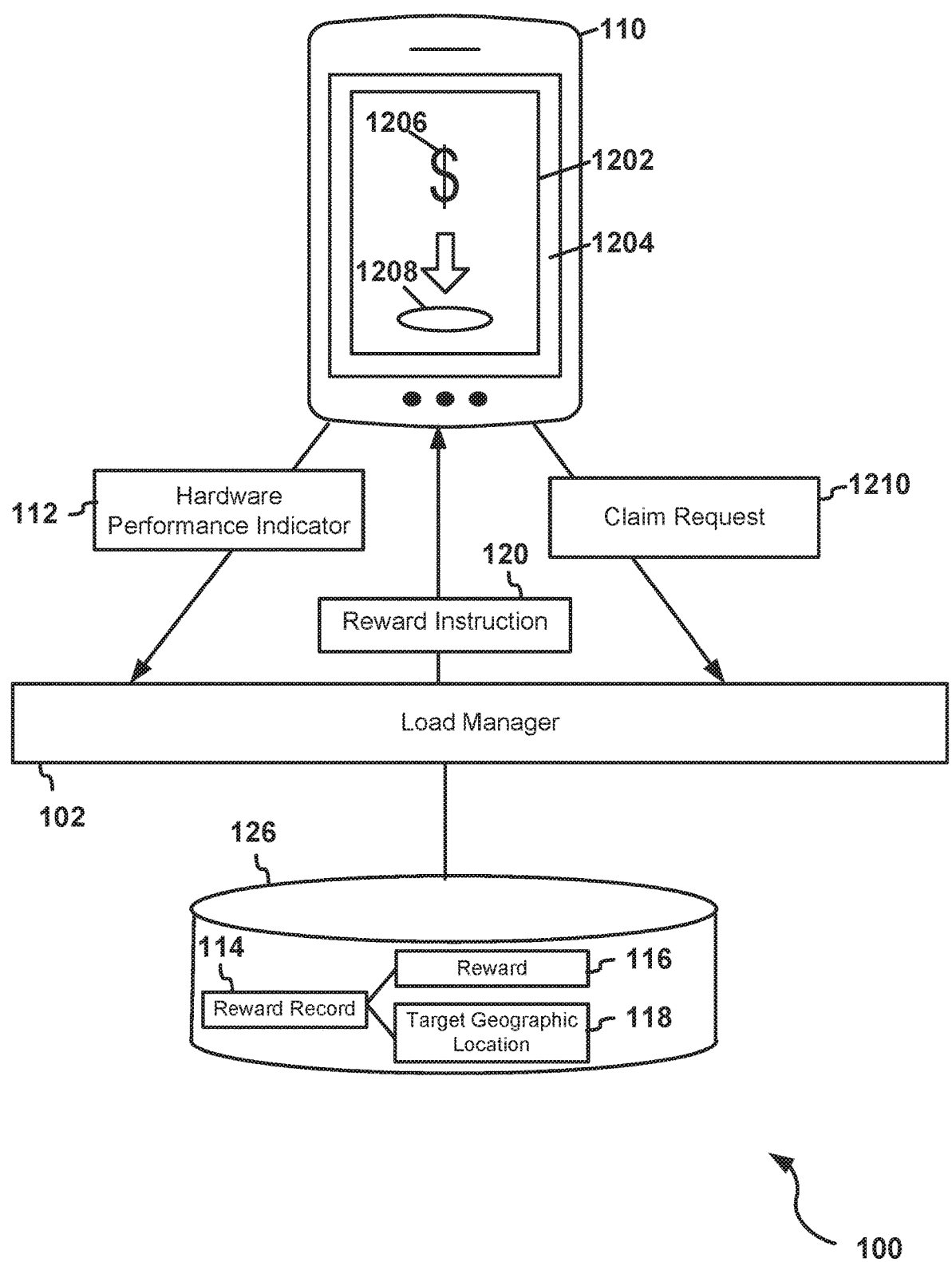
FIG. 12 illustrates an example of a system with a mobile device.

FIG. 12 illustrates an example of the system 100 with the mobile device 110. The mobile device 110 may execute an application 1202 that communicates with the load manager 102. A display 1204 of the mobile device 110 may show a graphical representation 1206 of the reward 116, or the reward record 114. The application 1202 may allow interactions with the graphical representation 1206 of the reward 116. For example the graphical representation 1206 of the reward record 116 may be selectable. In other examples, the application 1202 may display text that represents the target geographic location 118 and/or the reward 116. For example, the application 1202 may include a text messaging interface that displays information related to the reward 116 and/or the target geographic location 118.

In some examples, the application may display an augmented reality interface. The augmented reality interface may superimpose computer-generated images on a view of the real world. The augmented reality interface may super impose the graphical representation 1206 of the reward 118 on a real-world display at or in the proximity of a graphical representation 1208 of the target geographic location 118. The graphical representations may include images, icons, graphics, or any other displayable information. In some examples, the graphical representation 1206 of the reward 118 and the graphical representation of the target geographic location 118 may together or separately represent the reward record 114, described herein.

The application 1202 may receive the reward instruction 120 from the load manager 102. The application 1202 may graphically display the reward record in response to the reward instruction. Alternatively or in addition, the reward instruction 120 may instruct the application 1202 to display the graphical representation 1202 of the reward 116 and/or the graphical representation 1208 of the target geographic location 118. In some examples, the application 1202 may communicate with the load manager 102 according to an application protocol. The application protocol may define how information is exchanged between the load manager 102 and the application 1202. The reward instruction 120 and/or the infrastructure performance indicator 112 may be communicated between the load manager 102 and the application 1202 according to the application protocol. In some examples, the application protocol may include rules of a game.

In some examples, the application 1202 may send a claim request 1210 to the load manager. The claim request 1210 may include a request to claim the reward 116. In some examples, the claim request 1210 may include the current location of the mobile device 110, identifying information of the reward 116, identifying information of the mobile device 110, and other information related to the reward record 114. Alternatively or in addition, the claim request 1210 may include information related to an interaction graphical representation 1206 of the reward 116 and/or the graphical representation of the target geographic location 118. For example, the load manager 102 may communicate display information, such as HTML or other information, to the mobile device 110 that the application 1202 uses to display information related to the reward 116 and/or the target geographic location 118. The claim request 1210 may include information related to the interaction, such as a button click, with the display 1204 of the mobile device 110. The load manager 102 and/or the application 1202 may determine that there has been an interaction with a representation of the reward record 114.

The application 1202 may collect information related to communication with the mobile network 104. The application 1202 may collect the infrastructure performance indicator 112. For example, the application 1202 may collect the signal strength of the mobile device 110, the rate of data transmitted to/from the mobile network 104, and/or any other information descriptive of the operation of the hardware infrastructure 106, including a connection with the hardware infrastructure 106. The application may communicate the infrastructure performance indicator 112 to the load manager 102.

The system 100 may be implemented with additional, different, or fewer components. In addition, each component may include additional, different, or fewer components. For example, the network authority 108, the hardware infrastructure 106, and/or the mobile device 110 may be included in one or more systems external to the system 100. In other examples, the system may include the reward manager and the performance collector may be included in one or more external systems.

Figure 13:
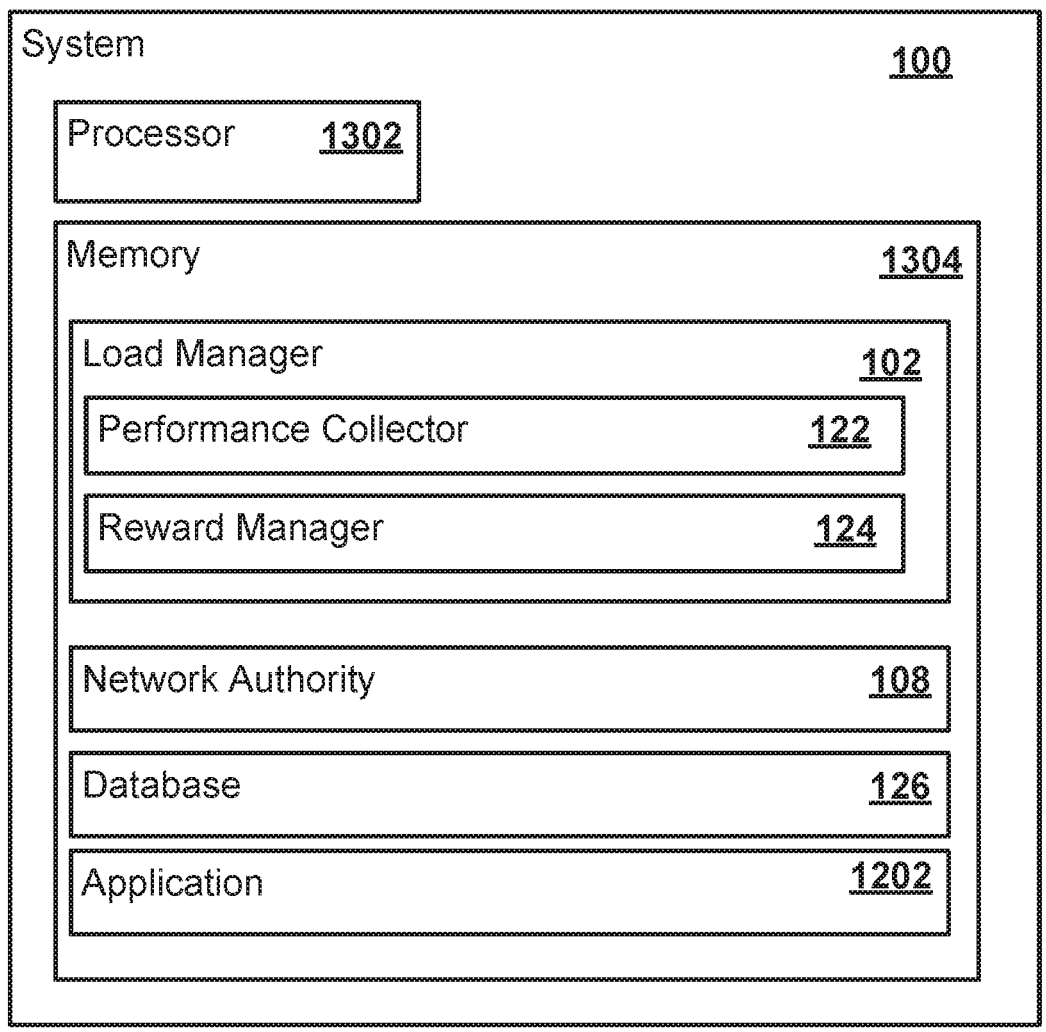
FIG. 13 illustrates an example of a system that includes a processor and a memory.

FIG. 13 illustrates an example of the system 100 that includes a processor 1302 and a memory 1304. The processor 1302 may further include one or more devices operable to execute logic of the system 100. The logic of the system 100 may include computer executable instructions or computer code embodied in the memory 1304 or in other memory that when executed by the processor 1302, cause the processor 1302 to perform the features implemented by the logic of the system 100. The computer code may include instructions executable with the processor 1302. In some examples, the memory 1304 may include the load manager 102, the network authority 108, the database 126, the Application 1202 and/or any subcomponent of the system 100 including, for example, the performance collector 122 and/or the reward manager 124. Alternatively or in addition, the memory 1304 may include the infrastructure performance indicator 112, the reward record 114, the reward 116 (or identification thereof), the target geographic location 116 (or identification thereof), the reward instruction 120, triggering condition 504, the reward creation criteria 506, and/or any of the threshold values described herein.

The system 100 may be implemented in many different ways. For example, the system may be implemented with one or more modules including the load manager 102, the network authority 108, the database 126, and/or the application 1202. Alternatively or in addition, the modules may include any subcomponent of the load manager 102 including, for example, the performance collector 122 and/or the reward manager 114. Each module may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 1304, for example, that comprises instructions executable with the processor 1302 or other processor to implement one or more of the features the module. When any one of the modules includes the portion of the memory that comprises instructions executable with the processor, the module may or may not include the processor. In some examples, the module may just be the portion of the memory 1304 or other physical memory that comprises instructions executable with the processor 1302 or other processor to implement the features of the module without the module including any other hardware. Because each module includes at least some hardware even when the included hardware comprises software, the each module may be interchangeably referred to as a hardware module.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . , and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising a processor configured to:
   communicate with a plurality of mobile devices in wireless communication with a hardware infrastructure of a mobile network, the hardware infrastructure configured to provide wireless access to the mobile network;
   determine an infrastructure performance indicator descriptive of operation of the hardware infrastructure; and
   analyze the infrastructure performance indicator through incentivizing movement of at least one of the mobile devices between multiple geographic locations wirelessly served by the hardware infrastructure to perform additional monitoring, the at least one of the mobile devices being located at a first geographic location wirelessly served by a first portion of the hardware infrastructure, wherein to analyze the infrastructure performance indicator, the processor is configured to:
      determine the infrastructure performance indicator satisfies a triggering condition to initiate analysis of a second portion of the hardware infrastructure;
      generate, in response to satisfaction of the triggering condition and the at least one of the mobile devices being located at the first geographic location, a reward record configured to associate a reward with a target geographic location wirelessly served by the second portion of the hardware infrastructure; and
      instruct the at least one of the mobile devices to display an indication of the reward record at a position on a corresponding display representative of the target geographic location to incentivize movement of the at least one of the mobile devices from the first geographic location to the target geographic location.

2. The system of claim 1, wherein the infrastructure performance indicator comprises a performance metric including at least one of:
   a quantity of information communicated between a mobile device and the second portion of the hardware infrastructure, or
   a measurement of a quality of service between a mobile device and the second portion of the hardware infrastructure.

3. The system of claim 1, wherein the processor is further configured to:
   receive a current geographic location of a mobile device; and
   cause the reward to be associated with an account corresponding to the at least one of the mobile devices in response to the current geographic location being within a predefined distance of the target geographic location.

4. The system of claim 1, wherein the processor is further configured to:
   receive, from a terminal device, the triggering condition and a reward creation parameter, the triggering condition including a condition for generating the reward record based on the infrastructure performance indicator and the reward creation parameter including an identifier of the target geographic location.

5. The system of claim 4, wherein to generate the reward, the processor is further configured to:
determine the triggering condition is satisfied based on the infrastructure performance indicator; and
generate, in response to satisfaction of the triggering condition, the reward record to associate the reward with the target geographic location based on the reward creation parameter.

6. The system of claim 5, wherein the triggering condition includes a criteria applicable to the second portion of the hardware infrastructure.

7. The system of claim 1, wherein the processor is further configured to:
transmit the infrastructure performance indicator to a remotely located server.

8. A non-transitory storage medium comprising computer executable instructions executable by a processor, the computer executable instructions comprising:
instructions executable by the processor to communicate with a plurality of mobile devices in wireless communication with a hardware infrastructure of a mobile network;
instructions executable by the processor to receive, from a mobile device in communication with a first portion of the hardware infrastructure, an infrastructure performance indicator, the infrastructure performance indicator comprising at least one of a usage metric, a quality of service measurement, an infrastructure event, or device metadata; and
instructions executable by the processor to analyze the infrastructure performance indicator through incentivizing movement of mobile devices between geographic service areas of the hardware infrastructure to perform additional monitoring, the instructions executable by the processor to analyze the infrastructure performance indicator further comprising:
instructions executable by the processor to determine the infrastructure performance indicator satisfies a triggering condition to initiate analysis of a second portion of the hardware infrastructure;
instructions executable by the processor to generate, based on analysis of the infrastructure performance indicator, a reward record that is associated with a reward and a target geographic location within a geographic service area of the second portion of the hardware infrastructure, the geographic service area not served by the first portion of the hardware infrastructure; and
instructions executable by the processor to send a reward instruction to the mobile device, the reward instruction descriptive of the reward and the target geographic location.

9. The non-transitory storage medium of claim 8, further comprising:
instructions executable by the processor to receive a message from the mobile device including a request to claim the reward; and
instructions executable by the processor to cause, in response to request, the reward to be associated with an account corresponding to the mobile device.

10. The non-transitory storage medium of claim 8, wherein the infrastructure performance indicator comprises an infrastructure event, the infrastructure event related to the second portion of the hardware infrastructure, the non-transitory storage medium further comprising:
instructions executable by the processor to identify the target geographic location, the target geographic location comprising a geographic location inside of the geographic service area of the second portion of the hardware infrastructure.

11. The non-transitory storage medium of claim 8, wherein the instructions executable to generate the reward record further comprise:
instructions executable by the processor to determine that an origination time of the infrastructure performance indicator is older than a threshold time value; and
instructions executable by the processor to generate the reward record in response to the original time being older than the threshold time value.

12. The non-transitory storage medium of claim 8, wherein the instructions executable to generate the reward record further comprise:
instructions executable by the processor to determine, based on analysis of the infrastructure performance indicator, the second portion of the hardware infrastructure includes compromised networking hardware.

13. The non-transitory storage medium of claim 8, wherein the infrastructure performance indicator includes an infrastructure event, the infrastructure event including an event time, the non-transitory storage medium comprising:
instructions executable by the processor to associate an activation time with the reward record, the activation time based on the event time; and
instructions executable by the processor to prohibit communication of the reward instruction before the activation time.

14. The non-transitory storage medium of claim 8, wherein the infrastructure performance indicator includes an infrastructure event, the infrastructure event including an event time, the non-transitory storage medium comprising:
instructions executable by the processor to associate a deactivation time with the reward record, the deactivation time based on the event time; and
instructions executable by the processor to prohibit communication of the reward instruction after the deactivation time.

15. A computer-implemented method, the method comprising:
communicating with a plurality of mobile devices in wireless communication with a hardware infrastructure of a mobile network;
receiving, from the mobile network, an infrastructure performance indicator descriptive of operation of the hardware infrastructure, the hardware infrastructure being in wireless communication with at least one of the mobile devices at a first geographic location wirelessly served by a first portion of the hardware infrastructure; and
analyze the infrastructure performance indicator through incentivizing movement of the at least one of the mobile devices to a target geographic location wirelessly served by a second portion of the hardware infrastructure to perform additional monitoring by:
determining the infrastructure performance indicator satisfies a triggering condition to initiate analysis of the second portion of the hardware infrastructure;
generating, in response to satisfaction of the triggering condition, a reward record, the reward record including an association between a reward and the target geographic location wirelessly served by the second portion of the hardware infrastructure; and sending a reward instruction to a mobile device, the reward instruction including a first parameter corresponding to the reward and a second parameter corresponding to the target geographic location.

16. The computer-implemented method of claim 15, further comprising:
receiving, from a terminal device, a triggering condition including a criteria for generating the reward based on the infrastructure performance indicator.

17. The computer-implemented method of claim 16, wherein the step of generating further comprises:
determining the infrastructure performance indicator satisfies the triggering condition; and
generating the reward in response to satisfaction of the triggering condition.

18. The computer-implemented method of claim 15, further comprising:
receiving, from a terminal device, a reward creation parameter, the reward creation parameter including at least one of reward information or an identifier of the target geographic location, wherein the reward record is generated based on the reward creation parameter.

19. The computer-implemented method of claim 15, wherein the mobile device is a first mobile device, the method further comprising:
determining the first mobile device is wirelessly served by the first portion of the hardware infrastructure;
determining a second mobile device is wirelessly served by the second portion of the hardware infrastructure;
permitting the first mobile device to receive information related to the reward; and
restricting the second mobile device from receiving information related to the reward.

* * * * *